Aug. 12, 1941.   H. J. SPANNER   2,252,474
DISCHARGE DEVICE
Filed Sept. 15, 1934   5 Sheets-Sheet 1
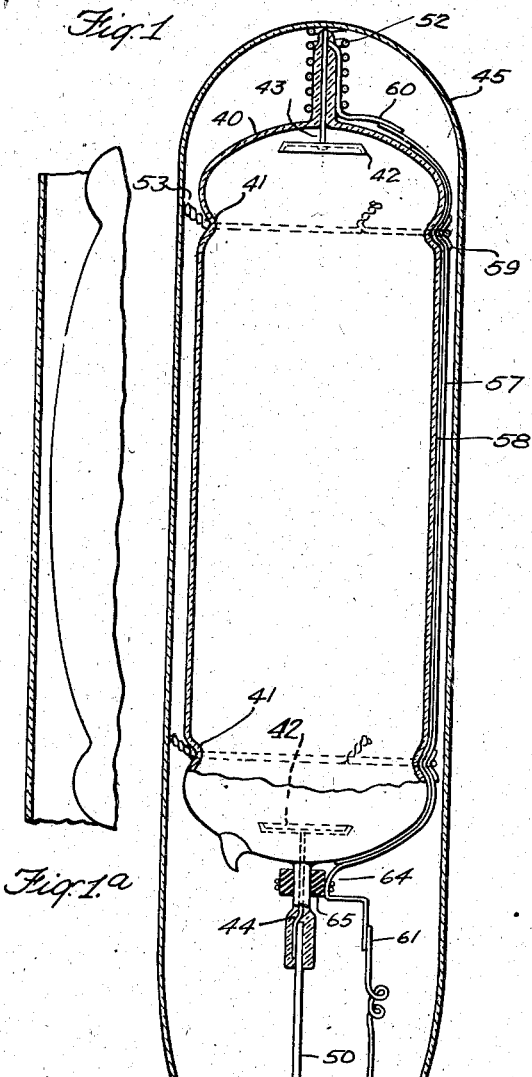
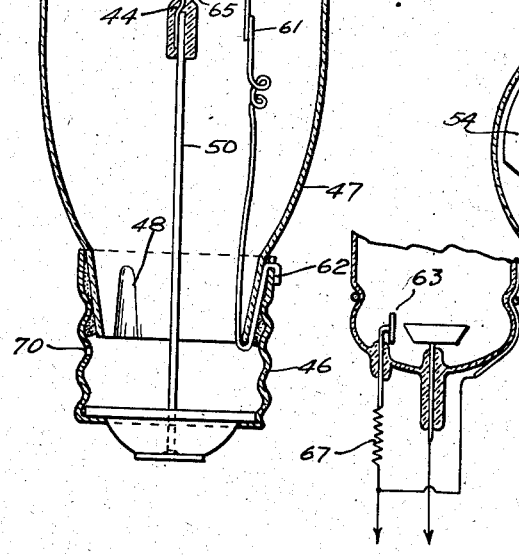
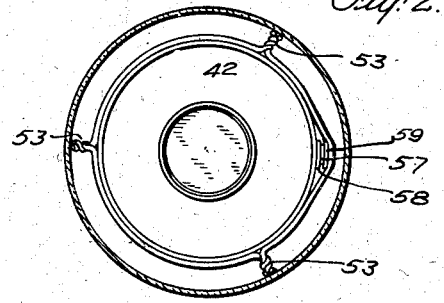
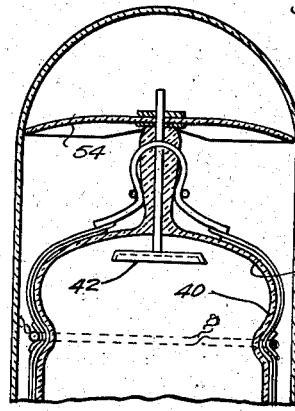
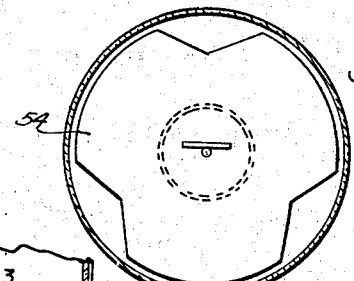
INVENTOR
HANS J. SPANNER
BY
ATTORNEY Aug. 12, 1941. H. J. SPANNER 2,252,474
DISCHARGE DEVICE
Filed Sept. 15, 1934 5 Sheets-Sheet 2
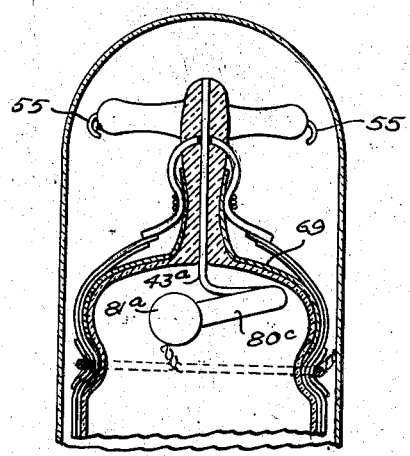
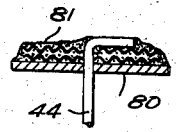
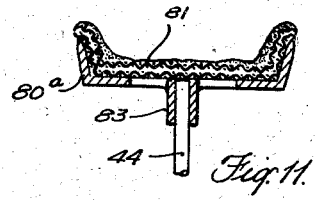
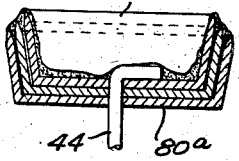
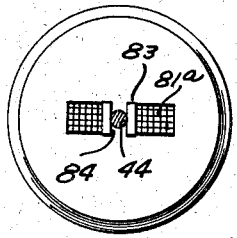
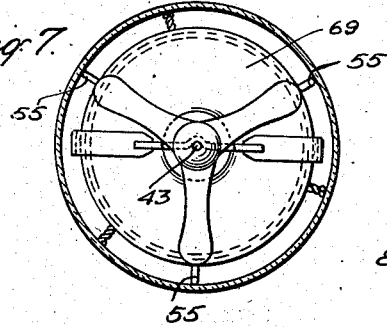
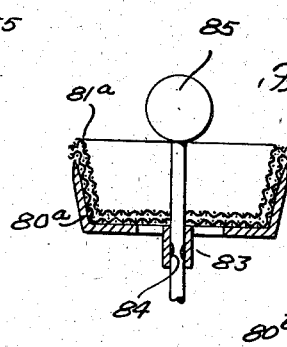
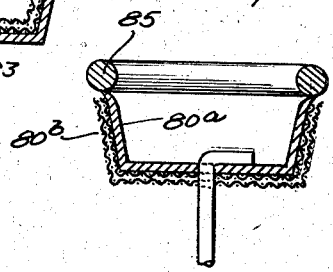
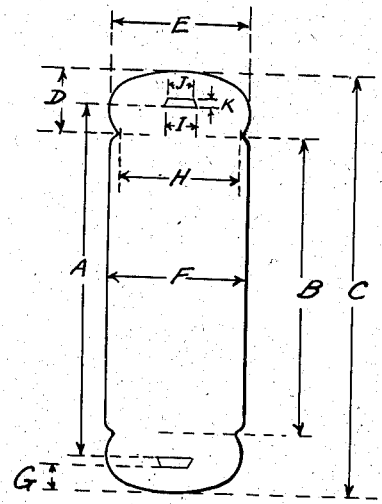
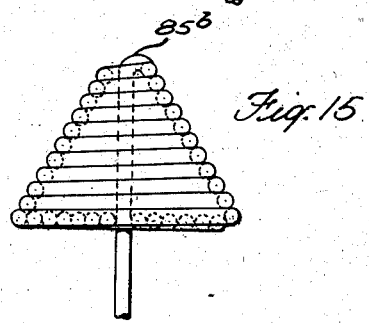
INVENTOR
HANS J. SPANNER
BY
ATTORNEY Aug. 12, 1941.　　　H. J. SPANNER　　　2,252,474
DISCHARGE DEVICE
Filed Sept. 15, 1934　　　5 Sheets-Sheet 3

INVENTOR
HANS J. SPANNER
BY
ATTORNEY

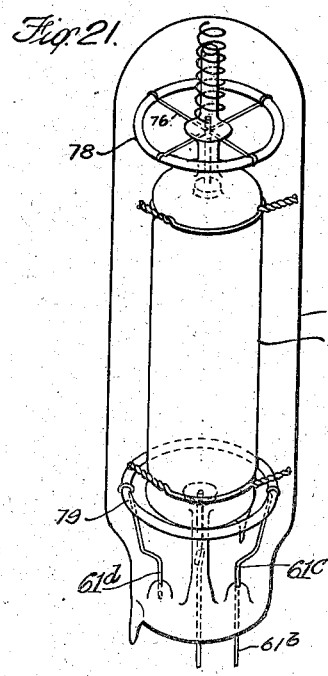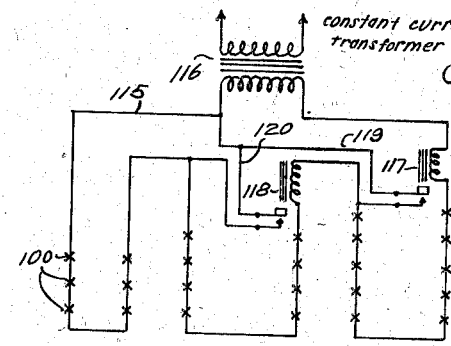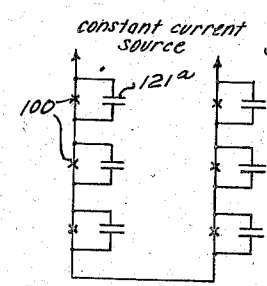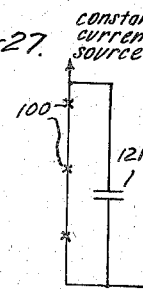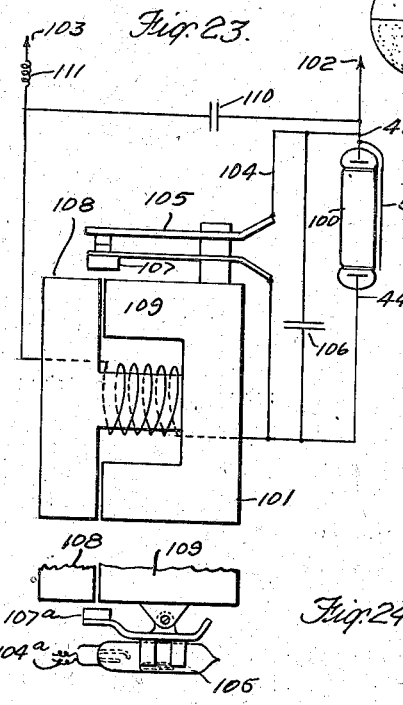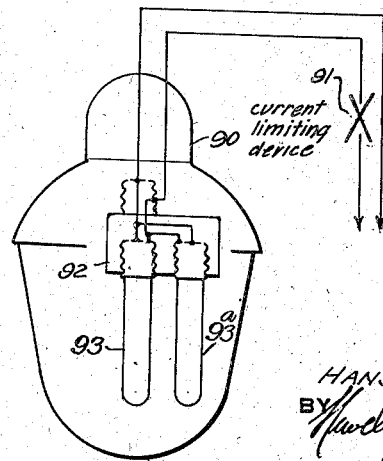

Aug. 12, 1941.                H. J. SPANNER                2,252,474
                             DISCHARGE DEVICE
                          Filed Sept. 15, 1934          5 Sheets-Sheet 5
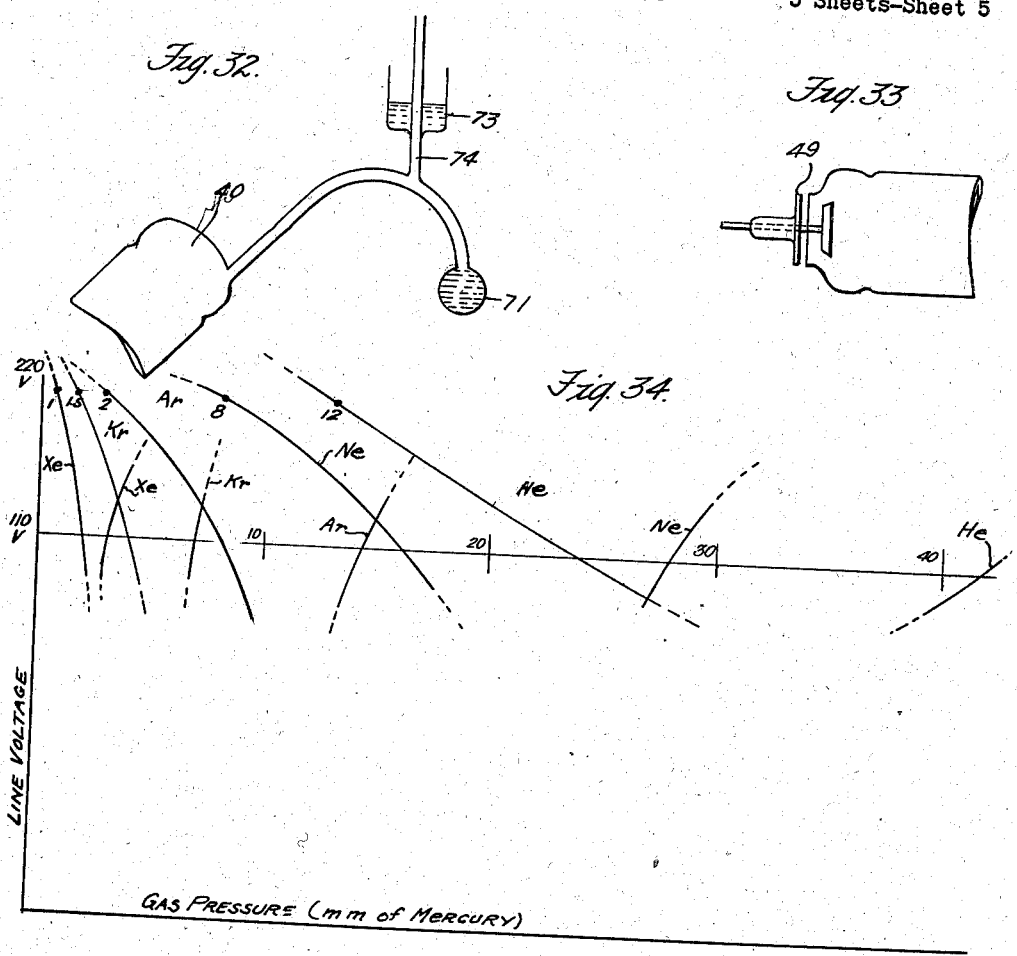
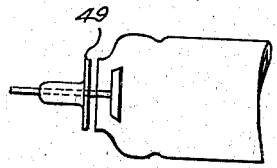
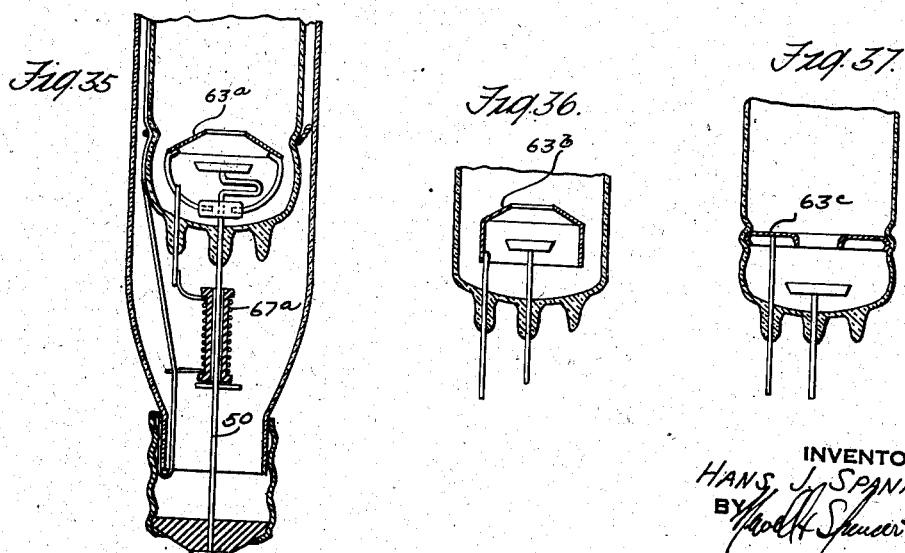
INVENTOR
HANS J. SPANNER
BY
ATTORNEY Patented Aug. 12, 1941

2,252,474

UNITED STATES PATENT OFFICE 2,252,474

DISCHARGE DEVICE

Hans J. Spanner, Berlin, Germany, assignor to General Electric Company, a corporation of New York Application September 15, 1934, Serial No. 744,206

7 Claims. (Cl. 176—122)

This invention relates to gaseous discharge devices and especially to such devices which are capable of giving high intensity and high efficiency to illumination by the luminous parts between solid electrodes.

During the last few years there have been a great deal of discussion and many publications concerning gaseous and especially metal vapor, discharge tubes as sources of illumination. These discussions have brought forward the facts that these lamps are usually very highly efficient and that a few of them may have a very long life as compared to the present day incandescent lamp. These are two important criterions in the judgement of new light sources. It has been claimed that such lamps will supplant the incandescent lamp as the most widely used source of illumination. However, each of the many well-known types of gas and metal vapor lamps available heretofore has had some disadvantage which has prevented its immediate acceptance in itself as a source of light for general illumination purposes; although many of these types of lamps already have wide use in many special fields.

In the prior applications Serial No. 351,368 filed March 30, 1929, Serial No. 359,330 filed April 30, 1929, Serial No. 387,986 filed August 23, 1929, Serial Nos. 397,427, 397,428 and 397,429 all filed October 4, 1929, Serial No. 400,805 filed October 19, 1929, Serial No. 558,148 filed August 19, 1931, Serial No. 643,502 filed November 19, 1932, Serial No. 714,949 filed March 10, 1934, of which the present application is a continuation in part I have described improvements in gaseous discharge lamps which have overcome the most serious deficiencies and which have made available for the first time a lamp which could be commercially substituted for incandescent lamps in standard lighting circuits.

Gaseous discharge lamps of various types have been known and tried heretofore. These have been of several important types:

First there have been the high voltage low current cold cathode Geisler tubes, now commonly used for advertising purposes. Such tubes have a comparatively long life of several thousand hours; but their efficiency is very low, usually less than ten lumens per watt depending upon the filling material used and give very low intensity per unit of length of the radiating part, so that very long tubes are required to give any substantial illumination. Furthermore, with this type of tube it has proven impracticable to obtain even an approximation of white light by any single filling, so that a combination of several tubes with different fillings has been required to obtain a light which can give any satisfactory color discrimination.

Mercury vapor lamps have also been used commercially to a substantial extent over a long period. These lamps, provided with pool electrodes of liquid mercury, (e. g., the well known Cooper-Hewitt lamps) have a relatively long life of several thousands of hours but a low efficiency, e. g., about 12 lumens per watt. The cost is high and they are subject to various difficulties of operation. They give the familiar intensely blue light which, although used satisfactorily in factories, where color discrimination is unimportant and high visual acuity is desired, disqualifies them for many uses.

These pool electrode mercury vapor lamps, because of the direct heating of the surface of the mercury by the discharge, tend always to produce vaporization of the mercury in excess of that which has been considered desirable; and consequently special precautions have been required for condensation of the mercury vapor or cooling of the liquid electrodes in order to prevent excessive pressure within such lamps. It has been pointed out many years ago that beyond a critical pressure, at which a minimum efficiency occurs, an increase in the vapor pressure of the mercury results in an increase in efficiency. When this has been tried, however, it has been found that the increase of efficiency is accompanied by increased difficulties, necessitating other special precautions, for example, the use of quartz envelopes. For example, a tendency of the arc to strike at the border between the mercury and the electrode vessel frequently results in breakage, even with quartz envelopes, whereas the necessity for great dissipation of heat at high temperature in order to control the vapor pressure seriously reduces the efficiency which it is practicable to obtain in this way.

A third type of lamp used filament resistance heated cathodes wih a low voltage and high current discharge. These tubes have been filled with various gaseous fillings to give various colored lights. With mercury the light is similar to that of the Cooper-Hewitt lamp, but the life of such a lamp is shorter than that of the pool electrode lamp because of the gradual vaporization of the heated filament producing a gradual darkening of the tube wall and eventually a burning out of the filament. With sodium a high efficiency has been obtained, but with a very short life due to rapid blackening of the tube wall. With inert gas fillings substantially the same colors are obtained as in the Geisler tubes with a somewhat higher efficiency but considerably shorter life.

The development of this latter type of lamp resulting finally in a high operating voltage relative to starting voltage high efficiency lamp utilizing an arc discharge through a high pressure filling is represented by the series of applications above listed. Lamps of this latter character are distinguished by their long life, high efficiency and good color discrimination as compared with lamps of similar fillings at lower pressure.

As I have now developed the lamps they operate with a minimum of loss in the ballasting device, with heat radiation reduced so far as is practicable with any lamp, so that full advantage is secured of the high efficiency inherent in this type of discharge. Furthermore, I have made possible such simple construction of the lamp and its connections that it may be substituted almost universally for the larger sizes of incandescent lamp with only a very slight change in the circuit to provide for a ballasting device. The lamps of this type are as simple and reliable as incandescent lamps, and may be made with even longer life since there are no filaments to burn out. By my invention I have made possible the operation of the electrodes at temperatures so low that the transfer of electrode metal to the transparent wall of the lamp is substantially negligible and the efficiency of the lamp may be thus maintained over a very long life. By combining metals having different spectral distribution, and especially with different vaporizing points, a substantially white light may be obtained which is far superior in its color rendition to incandescent lamps; and furthermore by combining incandescent lamps with the gaseous discharge lamps according to my invention a higher efficiency and substantially perfect color distribution may be obtained.

In the accompanying drawings I have illustrated several preferred constructions and circuits by which these and other objects and advantages of my invention may be attained. It should be understood that these drawings are given for purposes of illustration and are intended to make clear the principle of the invention so that those skilled in the art may apply it to various conditions and requirements, and may make numerous changes and modifications which are contemplated within the scope of the present invention. It is obviously impossible that all of such changes and modifications should be illustrated, and I have chosen therefore only those which will be most useful in explaining the invention.

Fig. 1 is a longitudinal section of a preferred embodiment.

Fig. 1a is a fragmentary view in longitudinal section similar to Fig. 1 of a modified form of the invention.

Fig. 2 is a cross-section through the center portion of the lamp of Fig. 1.

Fig. 3 is a partial section similar to that of Fig. 1 showing a modified construction in the upper end of the lamp.

Fig. 4 is a cross-section through the lamp of Fig. 3 just above the mounting disc 54.

Fig. 5 is a partial cross-section of a lamp similar to that shown in Fig. 1 but provided with an auxiliary electrode.

Fig. 6 is a partial longitudinal section similar to Fig. 3 but showing another modified construction.

Fig. 7 is a cross-section through the lamp of Fig. 6 just above the cross arm 55.

Fig. 8 is a diagrammatic plan view identifying the dimensions referred to in the following specification.

Figs. 9 to 15 inclusive are views in axial section, in plan and in elevation respectively as will be apparent, of various modified forms of electrodes which may be used in the lamp as shown in Figs. 1 to 7.

Figure 16:
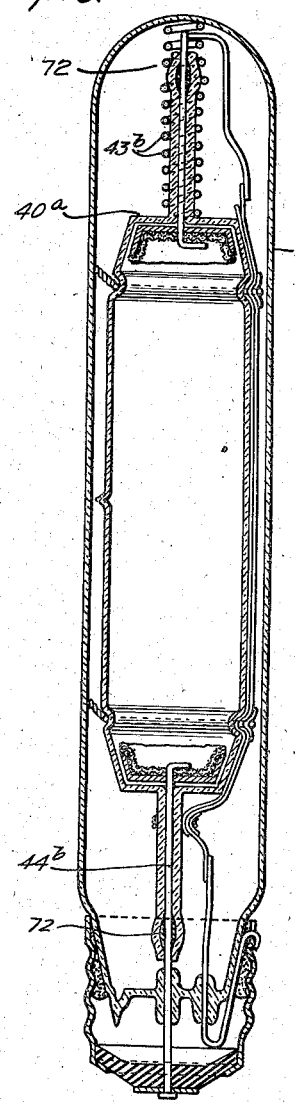

Fig. 16 is a sectional view similar to Fig. 1 of a lamp using a fused quartz envelope e. g., where the filling includes material vaporizable at a temperature higher than that of mercury.

Figure 17:
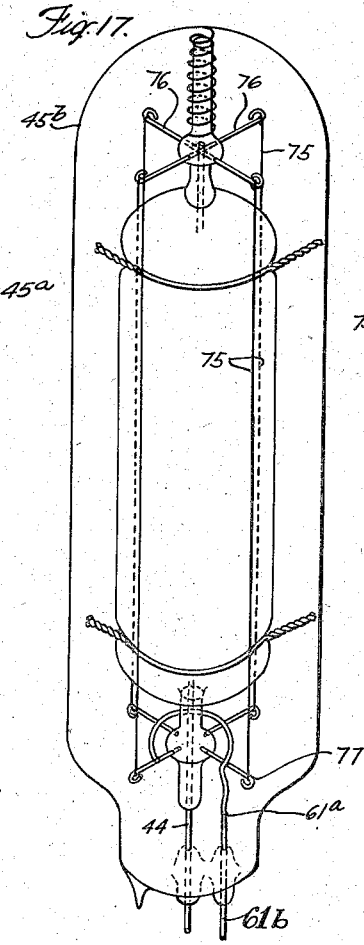

Fig. 17 is a perspective view of a modified lamp including its own ballasting device in the form of an incandescent filament.

Figure 18:
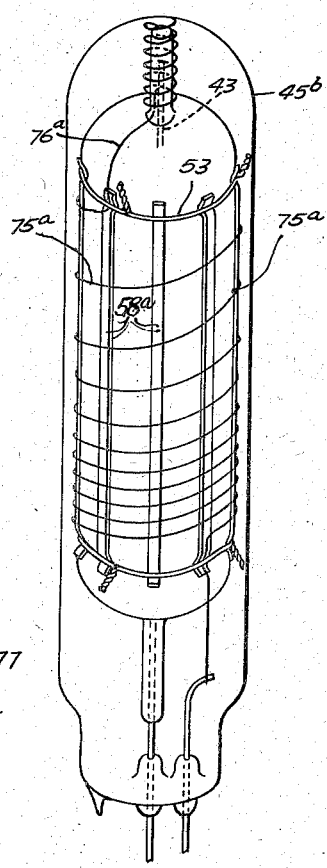

Fig. 18 is a view similar to Fig. 17 but showing the filament applied in a different manner.

Figure 19:
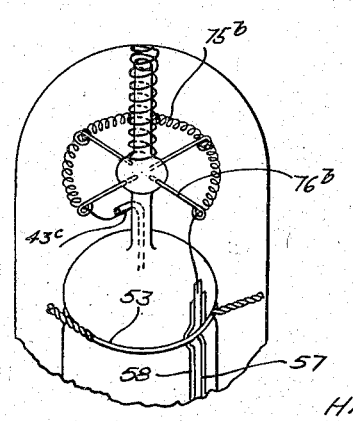

Fig. 19 is a view similar to Fig. 17 but partially broken away and showing a filament in still different position.

Figure 20:
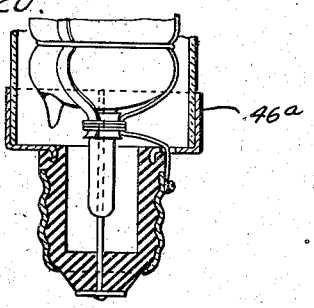

Fig. 20 is a fragmentary sectional view illustrating a modified type of base connection which may be used instead of that shown in Fig. 1 and Fig. 16.

Fig. 21 shows another modified form of the invention in which two cooperating discharge paths are provided.

Fig. 22 shows a modified form of the invention in which the outer transparent jacket is provided with a reflecting coating and is shaped to effect a desired light distribution.

Fig. 23 is a diagrammatic view illustrating a starting device for use in my invention; and Fig. 24 is a fragmentary view similar to the lower portion of Fig. 23 showing a similar starting device which may be substituted for that shown in Fig. 23.

Fig. 25 shows a special mounting of lamps embodying my invention by which they may automatically replace one another whenever the necessity arises.

Figs. 26 to 31 inclusive are wiring diagrams of various circuits in which the lamps e. g., as shown in the figures already named, may be included according to my invention.

Figure 32 is a view, partly in section, of an inner tube of a lamp, e. g., as shown in Figure 1, showing the process of its manufacture.

Figure 33 is a view partly in section showing the inner tube and electrodes during assembly according to my invention.

Figure 34 is a diagram showing the range of gas pressures to be used in the fillings of lamps embodying my invention.

Figures 35 to 37 are fragmentary views showing electrode shields.

Construction of lamp

Referring first to Fig. 1, I have shown therein a lamp suitable for commercial use to replace tungsten filament lamps of 200 to 1000 watt capacity in 110 volt circuits. This lamp as illustrated comprises essentially an inner tube or envelope 40 having constrictions 41 formed therein near each end so as to define pole vessels at the ends thereof. Electrodes 42 are positioned in each end close to the wall of the envelope 40 and supported on the lead-in wires 43 and 44 which are sealed into the glass or other material of the envelope 40.

An outer jacket 45 serves the manifold purpose of thermally insulating the inner tube or vessel 40 so as to control the dissipation of heat therefrom, supporting the inner tube 40 from the base connector 46 and covering and insulating the electrical connections of the lamp so that it may be freely handled without danger of shock.

As shown in Fig. 1 this jacket 45 is narrowed toward the bottom, e. g., as shown in 47 so that the neck of the lower end may be fitted within the connector base 46 and cemented thereto. Crimps or projections 48 may be formed in this neck portion to engage the base 46 and if suitably placed may be made to engage the screw thread on the inner wall so as to resist any longitudinal pull or preferably are made so as to dent the metal of the base slightly so as to resist circumferential twist.

The envelope 40 may be made, e. g., by automatic glass blowing apparatus with openings in its ends large enough to permit insertion of the electrodes, and/or other internal parts, and these openings closed by a piece fused into place after such parts are assembled in place. Thus, for example, the electrodes may be mounted in a glass flange 49 which is easily fused into the envelope at the opening. This I have shown in Fig. 33. The flange may be molded onto the lead-in wire or wires by inserting the wire through a mold, heating it to a temperature at which it will adhere to the glass, and pressing the molten glass about the lead-in wire to the desired form. If the electrode is not welded onto the lead-in wire until after this flange is molded in place, it will not interfere with the molding operation.

Mounting of inner envelope

The central connector wire 50 serves not only to connect the lower electrode 42 to the central terminal of the base 46 but also mechanically to support the inner tube or envelope 40 on the base. This leaves, however, the further problem of supporting the inner tube more or less rigidly against movement within the casing or jacket 45 so that in the event that the lamp is dropped or knocked against some other object either in use or in transit, that the inner tube will not crash against the outer jacket and so that the inner tube will at all times be substantially centered within the jacket so that a uniform thermal insulation will be attained. This I have found may be accomplished in various ways. I have shown several of these in the drawings but numerous others will occur to those skilled in the art if the following principles are kept in mind. In the first place the connection must be such that it will withstand relatively high temperatures without excessive deterioration. In the second place it must be one which will permit relative expansion and contraction both radially and axially between the outer jacket and inner tube. In the third place it should be sufficiently resilient so that, if once subjected to a sufficient shock to move the inner tube, it will nevertheless return to its original position so as to continue to support and protect the inner tube against subsequent shocks.

The construction shown in Fig. 1, I have found most satisfactorily to attain these results. In this case I have supported the inner tube primarily by resilient axial pressure between the central connecting post 50 and the dome top of the outer jacket 45. By providing a spring 52 which bears against the top of the jacket 45 and by making the top of this jacket in such shape that the farthest point from the center of the base 46 will be along the axis of the lamp (or at whatever other position it is desired to hold the inner tube) the tension of the spring 52 serves resiliently to support the inner tube not only axially but also radially.

Another radial support which I have found advantageous and which I prefer to use in addition to that of the spring 52 is provided by the annular wires 53. The wires 53 as will be more fully explained below serve an electrical function as a capacity on the surface of the envelope. By twisting loops and the ends at various positions circumferentially around the tube, as shown for example in Fig. 2, these wires may be made resiliently to press between the outer jacket 45 and the inner envelope 40 and thereby to maintain the inner envelope at the desired position.

In Figs. 3 and 4 I have shown another construction in which a mica disc 54 is used instead of the spring 52. This disc 54 being slightly resilient is bent down by the narrowing diameter of the tube and may hold the inner tube resiliently, both radially and axially, performing thus the same function as the spring 52.

In Figs. 6 and 7 I have shown still another method of supporting the inner tube within the jacket. In this case resilient wires 55 are held by a glass cross arm sealed onto the lead-in wire 3. These spring wires 55 press against the narrowing portions of the dome in the tube and thereby hold the inner tube in position in substantially the same way as the resilient mica disk 54.

It will be understood of course that other materials than the mica and wire and glass, etc., specifically shown can be used for substantially the same purposes.

I have found that it is desirable to fit the inner tube 40 almost as close as possible within the jacket 45 allowing adequately for relative expansion and contraction and for the thickness of connection which are to pass between the tubes. The advantage of this close fit is two fold. In the first place, the danger of crashing between them is substantially reduced because of the extremely short distance in which any movement of the inner tube 40 will be insufficient for it to acquire substantial momentum. In the second place, and equally important, is the fact that with the narrow spaces between there will be much less rapid convection and especially in the case where the lamp is burned bottom up, any tendency to overheating of the base and the connection in which the lamp is mounted will be very substantially reduced.

Connections

The use of the screw base connector or other simple connection capable of insertion at one end into a standard receptacle requires of course that a connection should be brought back from the far end of the tube to the base connector. I have taken advantage of this by forming this connection in the form of a flat strip to provide a capacity along the outside surface of the envelope 40 which serves both to prevent excessive accumulation of wall charges along the path of the discharge and during starting as an auxiliary electrode to which the initial discharge may take place from the lower main electrode 42. This strip alone will ordinarily not give enough capacity for the maximum desired effect. I have, therefore, provided also the bands 53 around the tube and I may also multiply the strips 57, e. g., as shown in Fig. 6 or increase the capacity by other means.

While the use of this strip as the return connection is, as already stated, attended with substantial advantage, it is not unattended by serious disadvantage if applied directly to the tube. I have found that when these tubes are operated at very high temperature, the envelope 40 is made of glass and the strip 56 applied directly to the glass electrolysis may occur between the strip on the one side and the conductive path of the discharge on the other, with a consequent darkening and deterioration of the glass used in the envelope. This is particularly likely to occur if starting or restarting devices providing a high voltage above the line voltage are used in connection with the lamp. I have found, however, that this possible disadvantage may be avoided by inserting a thin strip 58 of mica or other refractory insulating material between the surface of the glass and the strip 57. This strip does not interfere seriously with the capacity effect of the strip along the tube, but does control the electrolysis.

In the preferred embodiment of the invention the wire 53 mounted in the constriction 41 of the envelope 40 serves as an additional capacity and is therefore in contact or intimate electrical relation to the strip 57. If it were in actual contact one would have to treat this wire in the same manner as the strip 57, e. g., by inserting beneath it a mica or other refractory insulating strip. I have found, however, that substantially the same effect may be secured so far as control of electrolysis is concerned by inserting between the connection strip 57 and the annular wire 53 a thin piece of mica, etc., 59.

Another way of protecting against electrolysis in the luminous part of the tube is to fasten the strip at the ends of the tube against longitudinal movement relative thereto. Since the metal of the strip will expand more upon heating than the glass, etc., of the envelope 40, the strip will, in this case, be bowed outwardly and will thereby be spaced from the tube when it is hot, although it may lie substantially against the surface of the tube throughout its length when cold. In the embodiment illustrated in Fig. 1 this has been accomplished between the wires 53, which are twisted over the strip 57 so as to hold it securely within the constriction 41.

The connection between the lead-in wire 43 and the strip 57 is preferably made by welding, e. g., spot welding. In this case I have shown a short connecting strip to be spot welded to the outer end of the lead-in wire 43 and this connection covered by a bead of glass fused to the seal around the lead-in wire so as further to insure perfect maintenance of the connection between the lead-in wire and the connecting wire 60. The opposite end of this wire 60 is welded to the flat strip 57 which extends along the side of the tube and the lower end of which is in turn welded to a flexible connector 61 which is soldered to the shell of the base 46 at 62 to complete the connection.

The lower lead-in wire 44 is secured to the central connector 50 as already described so as to form a more or less rigid support for the envelope 40. This connection also is preferably made by spot welding and protected further by a fused covering of glass as shown. I prefer to use a flexible wire for the connection 61 and a stiff heavy wire for the connection 50 in order that there may be as little strain as possible put upon the envelope due to any difference in expansion or in mounting between the two connections.

In order that the strip 57 should serve as an auxiliary electrode, it is important that it should be brought as close as possible to that electrode 42 opposite to the electrode to which it is connected. Thus when the lamp is first energized by connection to an alternating current, a discharge may pass through the glass of the envelope 40 to the adjacent portion of the strip 57, as through a condenser. A convenient way of holding the strip in close contact to the portion of the envelope 40 immediately adjacent to the electrode 42 is shown in Figure 1, in which the strip 57 is tied around the bottom of the envelope 40 by means of wires 64. I have shown an insulating washer 65 which may advantageously be of asbestos or other soft material positioned between the strip 57 and the wires 64 and the lead-in wire 44. In this way I am able to make the shortest path electrically for the discharge between the edge of the electrode 42 and the strip 57 the direct path through the wall of the envelope and the gas filling therein, and to avoid any serious loss between the strip 57 and the lead-in wire 44. This precaution, however, is not absolutely necessary, and I have obtained very satisfactory results with the strip 57 wired directly over the glass seal around the lead-in wire 44.

Where a plurality of strips 57 are brought down from the upper lead 43 to the base of the lamp they may pull against each other through a common connector, e. g., spot welded to them to hold them against the glass immediately around the electrode, but away from the lead-in wire 44; or another simple construction for the same purpose is to use a mica or other refractory insulating disc slotted near its edge for reception of the strip 57. This may serve also a thermal insulating function, as described below.

*The jacket*

In Figure 1, I have shown the base connector as a standard screw base such as is commonly used with incandescent lamps and other types of electrical apparatus. The threaded shell of this base is shown as connected to the wire 61 by a solder connection at 62. The central contact is soldered to the central connecting wire 50. The jacket 45 in this case is narrowed near its bottom so as to form a neck of suitable diameter to be inserted into the shell of the base 46 in substantially the same way as is common practice in the manufacture of incandescent lamps. In many cases, however, it will be easier and more economical to use a jacket 45a having straight sides into which the inner envelope 40 may be inserted and which may then be secured directly to the base without further shaping. For this purpose I have shown in Figure 20 a skirted base in which the brass skirt 46a is preferably insulated, as shown, from the electrical parts of the base so that there is no danger to persons inserting the lamp or otherwise handling this brass skirt.

In addition to its use for thermal and electrical insulation and for mechanical support the jacket 45 may also serve optical functions. If the lamp is to be used in positions where the intense cord of light produced by the high pressure arc is objectionable, a frosted jacket or other diffusing material may be used for this purpose. If the lamp is to be used for lighting in a limited space, as for example, in indirect lighting, the jacket may be partially coated with a reflecting substance, e. g., as is commonly done with the bulb of incandescent lamps. This I have shown for example in Figure 22 in which the jacket 45a has been made in pear-shape with the lower portions hemispherical, so as to provide a hemispherical reflector to throw the downward component of the light upward and outward against the ceiling. This is shown only as one example of the extent to which the shape of the jacket 45 may be changed and of the application of a reflecting surface. Obviously, any desired shape and a reflecting covering on any desired portion of the lamp may be provided in this same way. It will be found that the reflecting coating reduces the heat loss through the coated part of the tube so that that part may be spaced farther from the inner envelope, and in general will be, both to avoid overheating of the coating and to give wider scope to the reflector.

The jacket 45 may also serve as a filter. Where for example, a particular spectral distribution is desired and the radiation of the lamp falls short in certain respects, these may be corrected by the use of a proper coloring in the material of the jacket 45 to filter down the excessively strong portions of the spectrum. For example, when a mercury and cadmium filling are used, the light may be slightly deficient in the yellow-red portion of the spectrum, and a slightly yellowish glass in the jacket 45 may correct this deficiency or if a mono-chromatic light is desired, a brown envelope with a mercury filling may be used, or with a cadmium filling a red glass, or if a limited ultra-violet light is desired, a filter such as those known in the trade under the trade-marks Uviol glass, Corex, or Corning No. 972, or other well known ultra-violet permeable filter glasses may be used. This jacket 45 may also be provided with fluorescent material to convert undesired radiation of shorter wave lengths into desired longer wave length radiations, for example, the red deficiency in the radiation from a mercury filling may be supplied by a red fluorescent material. Or it may be provided with a phosphorescent material to reduce the flicker of the lamp on alternating current.

In general, it is preferable to utilize the outer jacket 45 for these optical purposes rather than the inner envelope 40 which is subjected to the greater heating, it is, however, quite possible to perform many of these functions by suitable choice or treatment of the material used for the inner envelope, and in many cases it may be desirable to divide these functions between them.

The inner envelope

Where such special optical effects are not required, I have found that in general the best results are obtained using a highly refractory glass, e. g., a boro-silicate glass such as Pyrex (of Corning Glass Works) Supremax (of Schott, Jena) or other highly refractory glass. It will be understood of course that the outer jacket is subjected to much less severe temperature than the inner envelope 40, and consequently much more refractory glasses or other materials will be required for the inner envelope than are necessary for the outer jacket.

Use of space between jacket and envelope

In Figure 1, I have shown a vent 70 in the shell of the base 46. I have found this particularly desirable when the lamps are cemented onto a base of this kind because the cement frequently gives off water vapor and unless a vent is provided this water vapor may be entrapped within the envelope and detract from the appearance of the lamp or even cause trouble by condensation on the various parts of the lamp. In the embodiment shown the vent may be left open without serious objection, but it is preferred, and with some advantage it may, after the cement has been set and the water vapor allowed to be fully vented from the jacket, be sealed up, e. g., by soldering.

Ordinarily it is not necessary to seal the space between the envelope 40 and the jacket 45 since the presence of air therein is unobjectionable. In some cases, however, it will be desirable to maintain a reduced pressure or high vacuum within this space or to fill it with some special atmosphere.

In the construction illustrated in Fig. 16 the jacket 45a is sealed and evacuated. The lamp shown in this figure is one particularly adapted for use with cadmium, bismuth, gallium, zinc and other filling materials which vaporize at very high temperature. In such case the temperature to which the envelope 40a is subjected may be so great as to prevent the use of glass for this envelope and it will, therefore, be made of fused silica, or quartz. Since it is practically impossible to seal the lead-in wires 43a and 44a directly to the silica, they are carried through a relatively long tubular extension of the envelope 40a in the bore of which they are accurately fitted. A well 72 of some sealing material, e. g., special sealing wax, mercury, lead, etc., is formed within the tubular extensions far enough from the main body of the envelope so that it will not be destroyed by the heat of the discharge. Since this sealing material may be fused by the heat of the discharge, it is advisable in such case to evacuate the space between the jacket 45a and the inner envelope 40a so that there may be no gasses to heat the ends of the tube by convection.

In the examples shown in Figures 17, 18 and 19 filaments 75, 75a and 75b are provided to serve both as balasting means and as heating or lighting means, and in this case the jacket 45b is also preferably sealed. In this case, however, it is preferable instead of a vacuum to provide the jacket with a filling of a suitable gas, such as nitrogen, etc., as is customary in incandescent lamp practice.

The filament within the jacket may, as already stated, serve as the ballast resistance for the gaseous discharge within the envelope 40, and thus a self-contained lamp may be produced which can be screwed into and operated from any light socket.

The filament may also serve other purposes. For example, if it is wound closely around or along the surface of the envelope 40 it may serve as a capacity or starting strip thus taking the function of the strip 57 as shown in Fig. 1. Its heat which is highest before the filling is vaporized, serves to hasten such vaporization and thereby to reduce the starting time. If the filament is properly designed to be maintained at a low incandescence during normal operations it may supply red radiation which is lacking in the spectrum from the gaseous discharge.

It must be remembered in designing such lamps, however, that the back voltage or resistance of the gaseous discharge is very much lower in the moment immediately after the discharge is started than when the metal has vaporized and the lamp is operating normally. The filament 75, 75a or 75b, etc., must therefore be designed so that it will not be too much overheated during this initial period of high voltage.

When separate lamps are connected in series with gaseous discharge lamps of this type to serve as ballast it is ordinarily found that unless the filament is so greatly overloaded during the initial starting period as to seriously impair its light that the reduced voltage which is available to it after the metal filling of the discharge lamp has vaporized will not be sufficient to maintain a very intense incandescence. By mounting the two within the same jacket, however, I have found that this difficulty is overcome to a considerable extent. During the initial starting of the lamp when the filament is subjected to its highest voltage the envelope 40 is cold and the heat from the filament is therefore rapidly radiated and serves to hasten the vaporization of the metal filling and thereby more quickly to bring the lamp to normal operation and at the same time by the rapid cooling to protect the filament against overheating. On the other hand, when the metal filling is fully vaporized and the lamp is operating normally the voltage available to the filament will be substantially lower, but on the other hand the envelope 40 will be maintained at a very high temperature by the heat of the discharge within it and consequently there will be less cooling of the filament by radiation of the heat and it can be maintained at a higher degree of incandescence than if it were a separate lamp.

In Fig. 17 I have shown a plurality of filaments extending in parallel along the envelope 40 from the supporting cross arms 76 which are connected to the lead-in wire 43 to the lower supporting cross arms 77 which are held and insulated by the glass of the seal around the lower lead-in wire 44. The connection 61b is sealed through the base of the jacket and soldered to the shell of the base, e. g., 46 (not shown in this figure).

In the modification shown in Fig. 18 a connector wire 76a is welded to the lead-in wire 43 and carried under the annular wire 53. The end of this is connected to the filament 75a which is spiralled around the outside of the tube preferably over spaced mica strips 58a. In order that this filament may serve more effectively as a starting strip or capacity member, in this respect equivalent to the strip 57, it is preferable that the filament should be wound more closely about the tube near the opposite electrode than near the electrode to which it is connected.

In Fig. 19 the cross arms 76b are insulated from the lead-in wire 43 and serve merely as support for the filament 75b which is connected between the lead-in wire 43c and the capacity strip 57.

It will be understood moreover that if the prime consideration is to supplement for the spectral deficiencies of the gaseous discharge, the filament may be connected in parallel with the gaseous discharge and its ballast and in that case designed to give as nearly as possible the maximum intensity of the desired spectral radiation. Since the deficiency of the mercury vapor lamp is primarily in the red and yellow this filament may and should be designed to operate at relatively low temperature as compared with the ordinary incondescent lamp and will therefore have a very long life.

It may also be desirable in many cases to use separate filament lamps in series with the discharge. This is especially to be preferred if the filament is to be operated at bright incandescence with high pressure vapor lamps since in that case the life of the incandescent lamp, due to the overloading during the starting period, will be very much shorter than that of the discharge lamp. Even when separate lamps are used, however, it is desirable where possible to use filaments designed for a voltage intermediate between its actual voltage during starting and that during normal operation, and if greater incandescence is desired during normal operation I achieve this by reducing the normal operating voltage of the discharge lamp and thereby reducing the proportional variation on the filament. Thus, with 75–80 volt incandescent lamps and a 50 volt mercury vapor lamp the overload on the filament during starting will be compensated by the lower than rated voltage during normal operation and the life of the incandescent lamp will be about equal to that on its intended voltage.

In any case, whether the filament is in the same or a separate lamp, it is preferably of a material which, like tungsten, has a negative resistance characteristic with temperature, i. e., in which the resistance increases with a rise of temperature. Thus the greatest ballasting is automatically provided when it is needed during the starting period, and as the voltage of the lamp is increased by vaporization of its filling the resistance falls so that there is less energy taken up in the resistance. The full advantage of this characteristic cannot be secured with combinations designed to utilize the incandescent filament primarily as a light source, but where the light of the incandescent filament is not essential, a very high efficiency can thus be secured for the high pressure vapor lamp.

In the example shown in Fig. 21 a double discharge is provided, one within the envelope 40 and another in the jacket 45c, in this case therefore, it will also be necessary to seal the jacket 45c. The filling therein will depend upon the type of discharge desired in the outer space.

In the lamp shown in Fig. 21 electrodes 78 and 79 are mounted in the space between the jacket 45 and the envelope 40. The upper electrode 78 is connected to the upper lead-in wire 43 by means of the cross arms 76. The lower electrode 79 is supported on wires 61c and 61d, or may be supported by means of a cross arm or support wire similar to the cross arm 77 shown in Fig. 17.

If an arc type discharge is desired in the outer envelope or jacket, these electrodes 78 and 79 (or in the case of D. C. one of them) are preferably made of loosely twisted wires and impregnated with a material which includes in addition to an activating material a thermal insulating material so that the loose ends or points of the wires may be easily heated to incandescence by the discharge without heating the entire electrode. This action is more fully described below in the discussion of electrodes. This is most important when the envelope 40 is of large diameter so that the electrodes 78 and 79 must be of large area since in that case it may be difficult to maintain the entire electrode at a temperature sufficiently high to maintain an arc type discharge. In such case it may also be preferable to use several electrodes rather than the continuous ring electrode as shown.

The electrode 79 is preferably placed as closely as possible around the envelope 40 near the lower electrode 42. It should, however, be far enough away from the envelope 40 so that the path of the discharge will not impinge upon the wall of the envelope. This is especially important when other than quartz or a very highly refractory glass is used for the envelope 40.

By placing the electrode 79 close to the electrode 42, and especially when the annular band 53 is used around the electrode a capacity discharge takes place through the wall of the envelope 40 when the tube is first started and thus the electrode 59 may to some extent at least serve the function of an auxiliary electrode or the strip 57. As soon as such a discharge is established the gas within the envelope 40 and the jacket 45c will be ionized until the path of the gaseous discharge to the upper electrode 42 and through the upper electrode 58 will be shorter electrically than the direct path through the wall of the envelope 40. In order to facilitate starting a substantial part or the entire pole vessel adjacent the electrode 79 may be coated with a conducting substance to act as a capacity. This may for example be a mirror coating as more fully described below in connection with Fig. 3.

This type of lamp permits the direct mixing of the radiation from gases or vapors having complementary spectra and furthermore permits the use within the envelope 40 of vaporizable filling materials which vaporize at high temperatures such that condensation might occur on the wall of the envelope 40 except for the heating of the envelope 40 by the discharge within the jacket 45c as well as by the discharge within the envelope itself.

In this way substantially perfect white light or various controlled colors can be attained. For example, the one envelope may contain sodium with neon as the starting gas and the other envelope mercury with argon as the starting gas. The sodium adds to the yellow radiation of the mercury, to which the eye is highly sensitive, while the short wave spectrum of the mercury stimulates further the response of the eye to the yellow. If sodium is used at low pressure so that the neon continues to carry part of the discharge the neon may fill the red deficiency or cadmium may be included with the mercury and the sodium discharge operated to give almost pure yellow light, or sodium may be included with the mercury and a pure neon discharge in the outer envelope used to supply the red. Numerous other combinations of gases and/or metal vapors can be used.

Shape and dimensions

It will be observed in the drawings that the electrodes are uniformly placed close to the ends of the tubes. This is not so important in the case of lamps using permanent gases to support the discharge, but in the case of vaporizable fillings such as mercury, cadmium, bismuth, zinc, etc., it is extremely important that the electrodes should be so close to the ends of the tube that the portions of the tube or envelope 40 behind the electrode cannot be cooled enough to condense the filling. In fact, I have found it preferable to construct the tube so that during operation the temperature behind the electrode will be almost as high as that of the parts directly exposed to the discharge and after the discharge has ceased will cool more slowly than the other parts, so that condensation will occur along the path of the discharge instead of behind the electrode. This also requires a smoothly rounded end on the envelope without isolated chambers or corners which would be subject to excessive cooling. Ordinary stem sealing-in should therefore be avoided.

This is accomplished in part by positioning the electrode close to the ends of the tubes as described, and in part by providing greater thermal insulation on the ends of the tubes than on the portions within the path of the discharge. For this purpose a mirrored surface, e. g., as shown at 66 in Fig. 3 or a layer of some insulating material as shown at 69 in Fig. 6, or both may be provided. In some cases it may be even advantageous to fill the entire end of the tube above the electrode with some lose insulating material such as asbestos. When the supporting disc 54 is used, it serves to some extent as a thermal insulating means for the electrode end of the vessel since it is a barrier both to radiation and to convection from the ends of the tube. A similar disc may be used below the tube to serve the same thermal purpose, and this function may be combined with the function of holding the strip 57 as already described above.

The constriction 41 near the end of the tube has already been mentioned as confining the pole vessel and as holding the wires 53. The primary function of this constriction, however, is to protect the luminous portions of the tube between the electrodes against darkening in case some of the electrode materials should be vaporized by local or temporary overheating. When these constrictions are provided they form a barrier upon which such vaporized metal will be deposited before entering the main luminous portion of the tube. Furthermore, the coolest part of the tube with this construction will be just behind these constrictions, where the pole vessels are enlarged away from the electrodes and from the path of the discharge. This portion of the wall does not play any very important part in the transmission of light from the luminous discharge, and therefore a darkening of the glass in this area will not seriously affect the luminous efficiency of the tube. By maintaining this cool area, any electrode materials or vapors which are formed will be promptly condensed within the pole vessel and before they pass into the more important luminous portions of the tube.

The dimensions of these lamps are important, and the best results will be attained only when the lamps are properly dimensioned. Although no absolute limit has been found and no absolute rules can be stated, my experience has demonstrated that certain general principles should be observed when designing lamps of this character. As already stated, the electrodes should in general be as close as practicable to the end walls of the envelope 40 in order to maintain a temperature thereon which is not substantially lower than that of other parts of the envelope wall. As stated also, the jacket 45 should be as close as possible to the inner envelope 40. The diameter of the pole vessels will depend to a large extent upon the filling which is to be used. If a vaporizable filling which condenses at relatively high temperature is used, the pole vessels should be fairly close to the electrodes so as to prevent excessive condensation of the filling material within the pole vessels. This is illustrated for example by Fig. 16, in which the pole vessel are fitted as closely as possible to the electrodes. If, on the other hand, the filling is a permanent gas such as neon, argon, etc., the pole vessels may be much larger and may be allowed to operate at relatively cool temperatures whereby to give greater assurance of condensation of any electrode material which may be vaporized during operation within the pole vessel and before it reaches the principal luminous portions of the tube.

The length of the tube between electrodes is substantially controlled by the voltage at which the lamp is operated. As an empirical rule it may be stated that the best results will be obtained when the length between electrodes is approximately 1 to 1.5 mm. per volt. The voltage being of course the actual voltage across the electrodes and not including the balasting or other current limiting device. At lower voltages the electrode drop becomes proportionally a greater factor in the lamp voltage so that this rule cannot be applied as an absolute linear relation. If the electrode drop is estimated its application may be extended.

This rule applies roughly for vapor fillings at pressures of about one atmosphere. With higher pressure a shorter arc path may be more advantageous, or even necessary, and at very high pressures a very short and extremely intense arc may be obtained approaching even to a point of light condition.

The diameter of the tube, with glass and a given pressure, is controlled by the temperature at which the lamp is to be operated and the current loading. The other dimensions of the lamp being more or less fixed as already described, the heat dissipating capacity of the lamp by which its proper operating temperature is maintained must be controlled by the diameter. I have found that for a given vapor pressure and wattage if the voltage is decreased the length should be decreased and the diameter of the lamp should be increased; and with a given voltage that for different wattages the area per watt of the lamp should remain approximately the same. This rule, however, cannot be exactly applied, since with the smaller lamps there may be, and frequently is, a lower efficiency, and consequently a greater proportion of the energy input is radiated as heat. For this reason the area per watt increases at least for a time as the wattage is decreased, but below about 200 watt a further decrease in size results in noticeably greater proportional heat loss through the connection, so that ordinarily with these smaller lamps the area per watt will not be further increased, but may even begin once more to decrease. As a rough empirical rule, it may be stated that the area per watt of lamps in square millimeters between 500 and 200 watts is equal to $$K + \frac{13,000}{w}$$

where $K$ is a constant and $w$ is the wattage of the lamp. With a lamp designed as shown in Fig. 1 and having a mercury vapor filling of about one atmosphere operating pressure $k$ equals about 25. This may vary however, and excellent results may be obtained with $k$ anywhere between 15 and 50 or even beyond these limits.

The shape of the envelope over the main path of the discharge will ordinarily be cylindrical, but it may be substantially varied, and I have found advantage in giving it a slight bulge near the center, as shown, for example, in Fig. 1a, in order that that portion may be most rapidly cooled after the lamp is extinguished, and the filling therefore condensed upon a portion of the envelope which will be most strongly heated during initial operation so that the filling will be quickly vaporized upon restarting of the lamp. An envelope bulged at least on its upper side, may also be desirable for horizontal burning of lamps especially at voltages above 110 v. The size of the electrodes depends primarily upon the current load, upon the type of electrode and upon the degree of activation. With given types of electrodes and activation, if the electrodes are too big they will not heat sufficiently to maintain the arc and thus the lamp may continue to give only a glow discharge and electrodes may even sputter like a Geisler tube electrode. If, on the other hand, the electrode is too small, it will melt or vaporize away and disintegrate. No absolute rule as to determination of the size can be stated, but in general the size should be such that an operating temperature of about 700° C. will be maintained on the electrodes.

In order to assist in the application of these general principles I am giving herewith a table of dimensions of representative lamps of various sizes. The dimensions indicated by letters on this table are to be found on Figure 8 of the drawings, and are expressed in m. m. except where otherwise specified. These examples are of course given only as illustrations and it is to be understood that variations either may be made from these exact dimensions without destroying the usefulness of the lamp.

|  | Lamp | | | | | | | | | | | Lead-in wire | No. of meshes | Filling (initial) | Pressures (operating) |
|---|---|---|---|---|---|---|---|---|---|---|---|---|---|---|---|
|  | A | B | C | D | E | F | G | H | I | J | K |  |  |  | mm. |
| 110 v., 100 watts | 88 | 69 | 96 |  | 23 | 24 |  | 21 | 9 | 9 | 3 | .025 / .016 | 2 | Ar 18 | Hg 760 |
| 110 v., 200 watts | 110 | 90 | 130 | 15 | 25 | 25 | 4 | 21 | 9 | 9 | 3 | .025 | 2 | Ar 16 | Hg 760 |
| 110 v., 300 watts | 124 | 100 | 145 | 20 | 35 | 36 | 4 | 34 | 10 | 10 | 4 | .025 | 2 | Ar 14 | Hg 760 |
| 110 v., 400 watts | 132 | 110 | 156 | 22 | 39 | 40 | 4 | 36 | 12 | 12 | 4 | .025 | 2 | Ar 12 | Hg 760 |
| 110 v. | 170 | 146 | 185 | 23 | 44 | 45 | 6 | 41 | 14 | 14 | 4 | .025 | 2 | Ne 15 |  |
| 220 v., 400 watts | 170 | 138 | 190 | 22 | 32 | 32 | 5 | 28 | 13 | 12.5 | 4 | .025 | 2 | Ar 8 | Hg 760 |
| 110 v., 150 watts | 106 | 85 | 118 | 25 | 38 | 38 | 5 | 34 | 13 | 12.5 | Disc | .016 | 2 | Ar 17 | Hg 760 |
|  |  |  |  | 15 | 30 | 30 | 4 | 26 | 8 |  |  |  |  |  |  |

Mesh 40 strands per inch .007 inch nickel wire.
Electrode cups and discs of .010 inch sheet nickel.

Horizontal burning

Prior to my invention there has been great difficulty experienced in operating lamps of this type in horizontal positions. This I have found to be due to the tendency of an arc discharge to follow an arcuate path between horizontally spaced electrodes. Thus when a high voltage lamp is placed in a horizontal position the arc discharge passes too close to the wall of the envelope and the upper wall of the envelope is therefore so strongly heated that it is soon melted or destroyed. This can be counteracted by setting up a counter-magnetic field in the vicinity of the lamp, but such a solution is not ordinarily practicable. I have found, however, that horizontal burning lamps can be practically constructed by use of any of various expedients. In the first place, if a quartz envelope is used the excessive heating of the upper part of the envelope will not be objectionable and the lamp can be operated in any position. If hard glass is used a thickening of the envelope in this area or a bulging out in this area may avoid the difficulty. If an electrode which is tapered toward the discharge so as to maintain the arc at a substantially constant point well below the upper surface of the wall is used, the arc may be held away from the wall and successful horizontal burning of the lamp may be achieved in this way. In some cases, particularly with the higher voltages, it may be necessary in addition to thus holding the arc by a tapered electrode to place the electrode in an eccentric position which will be below the axis of the envelope when it is placed in the horizontal position or to curve the envelope itself, or at least the upper part of its wall, to an arcuate form, shaped to correspond to the natural path of the arc discharge.

I have found, however, that all of these expedients which may be necessary with 220 volts or higher can be ignored when lamps are made to operate on 110 volts; and lamps substantially as shown in the drawings of the present application may be satisfactorily operated in any position from a 110 volt line. If lamps are to be operated in a horizontal position, therefore, I prefer rather than constructing special devices to meet the requirements of higher voltages to use lamp designed for 110 volt operation (or lower) and to place as many as necessary in series according to the line voltage which is to be utilized, or where that is not desirable, to use a step-down transformer.

*Electrodes*

I have already discussed above the considerations which control the size of the electrodes. I have also given in the table of dimensions of typical lamps the dimensions of electrodes used therein. The electrodes referred to in that table are those as shown in Figures 1, 3 and 9 to 12, consisting of a sheet nickel cup or plate, 80 or 80a on which is secured one or more layers of nickel wire mesh. Activating material is pressed into and over the interstices of the wire mesh so as to be anchored thereby in intimate contact with the nickel. This activating material in the examples given in the table of dimensions consists of barium oxide reduced by a treatment as more fully specified hereinafter. I have found this type of electrode most satisfactory for general purposes. The activation when properly prepared so far reduces the resistance of the electrodes to the passage of the discharge as to permit operation at temperatures well below the temperature at which the nickel of the electrodes would be volatilized, e. g., around 700° C. and furthermore permits cold starting of the lamp either directly from the supply line through auxiliary electrodes (either the strip 51 as shown in Fig. 1 or an internal auxiliary electrode as shown at 63 in Fig. 5) or with very simple inductive starting devices as hereinafter described, which may be the ballasting device as well.

The use of the wire mesh for their construction, which leaves irregular points or thin edges projecting from the electrodes, I have found to be of particular advantage, apparently because it facilitates the heating of the electrodes and the conversion of the discharge to an arc type discharge. These small points of electrode material are readily surrounded with the activation material and consequently the first discharge which occurs through the auxiliary electrode is readily established to one of these points. Since the material of such a point is more or less isolated, it is readily heated by the discharge to a temperature at which it is thermionic and at which the discharge is readily converted into an arc. Thus, although the initial discharge might be inadequate to heat the entire electrode, if it can occur first to such an isolated point of the electrode such heating may readily occur and the arc-type discharge then will be initiated and will serve to heat the entire electrode.

In Fig. 12 I have shown a modified construction intended to accomplish substantially the same purpose. In this case instead of using wire mesh a series of sheet nickel cups are nested one in the other. These are preferably roughly stamped out so that the edges are more or less frayed in the process. These frayed edges may therefore serve the same purpose as just discussed above for the ends or points of the wires of the mesh used as shown in Figs. 10 and 11 or the mesh disc shown in Fig. 9. With this type of electrode the activation material may be supplied between and/or within the cups and especially between the edges of the nested cups.

In the electrodes as shown in Figs. 9 to 14 the cup or disc portions of the electrodes as just described, is secured on the lead-in wire 44 of tungsten or other refractory metal preferably by welding. In the examples illustrated in Figs. 9, 12 and 14, the wire extends through the electrode and is bent over top thereof and spot welded thereto. In the examples illustrated in Figs. 10, 11 and 13 lips 83 are turned down from the material of the cups and are welded to the lead-in wire 44, e. g., as shown at 84. Fig. 11 is a bottom plan view of the electrode shown in Fig. 10.

In Fig. 9 I have shown another type of electrode comprising a twisted roll 81c of fine nickel wires secured to one end of a horseshoe or disc 80 of nickel, tungsten or other refractory metal and the latter in its turn being connected to the lead-in wire 43a. The roll 81c of fine nickel wires is preferably made of short lengths of wires twisted together so that there will be numerous isolated points for the purpose as already described. Into this fabric of wires the activation material is worked as already described on connection with the wire mesh of Figs. 9 and 10; and its operation will be much the same as that of the electrodes shown in Fig. 10.

In all of these electrodes it will be observed that there is a closed path for passage of eddy currents so that after the tube is formed with the electrode in place activation material may be reduced and the electrode cleaned of occluded and combined gases by an induction heating with high frequency current.

In these examples I have referred to nickel as the material used in the electrodes. My invention, however, is not to be limited to nickel, in fact I have found that many other metals can be used but nickel I have found most desirable because it seems to hold the activation material best and does not interfere with the effectiveness of the activation material. So long as the electrodes are properly designed and operated, so that their temperature is maintained below that at which volatilization of the metal occurs, there seems to be no objection to the use of nickel. It is therefore to be preferred over other materials. If, however, special requirements of design or operation necessitate overheating of electrodes, a more refractory material may be preferred. Thus I have used tantalum, molybdenum, tungsten, etc. When these metals are used, they are advantageously covered with a thin surfacing of nickel, but even this is not essential.

In Figs. 13 to 15 I have shown electrodes which combine a nickel cup similar to those shown in Figs. 10 and 12 with a more refractory type of electrode made for example of tungsten, molybdenum, tantalum, etc.

With this type of electrode the initial discharge goes first to the nickel wires with their intimately associated activating material, and the points of these wires are readily heated to a temperature at which an arc discharge is established, as fully discussed above. During this first period of heating up the electrodes, the voltage drop through the filling of the lamp is a minimum and the lower electrode drop of the activated mesh cup is more important electrically than the shorter distance between the refractory massive portions of the electrode 85, 85a or 85b. However, as the metal filling of the lamp is vaporized by the arc the voltage drop through the filling is increased and by the heating of these massive portions of the electrode their resistance is decreased until the shortest electrical path lies between the massive portions of the electrodes instead of between the mesh portions. This is of advantage especially where, for reason, e. g., as suggested below, it is desired to overload the discharge.

The advantage of such a construction is twofold. In the first place, the massive refractory portions 85 by holding the discharge during the high temperature operation of the tubes protect the less refractory parts of the electrodes from overheating, and thus substantially prevent the destruction or the deactivation of those portions of the electrodes and the transfer by vaporization of electrode metal to the transparent wall of the tube. In the second place, this refractory portion 85 may, if properly designed, be maintained at incandescence, and may serve therefore as a point of light source of radiation rich in the red and yellow portions of the spectrum which will supplement the spectral distribution of radiation, e. g., from the high pressure mercury arc.

In Fig. 15 I have shown a massive type of electrode 85b which may be substituted for the ball 85 as shown in Fig. 13. The electrode shown in Fig. 15 is made by winding into a return spiral, preferably in substantially conical form, a heavy wire of tungsten, molybdenum, etc., e. g., wire of about 0.50 mm. diameter.

This spiral is returned to the center at the bottom in order to close in the space within the cone, and this space may be filled with activation material. I have found that even with this combination of an activated cup and a massive electrode it is desirable to provide some activation on the massive electrode.

In Fig. 14 a rim 85a has been provided on the cup 80a to which is secured, e. g., by spot welding. This rim may be a solid tungsten, etc., wire, e. g., of about 0.70 mm. in diameter or may be formed of twisted or parallel wires of smaller diameter bound together and having activation material in the interstices therebetween. In this case I have shown the wire mesh on the outside instead of the inside of the cup 80a. This is especially desirable in this case because it forms a shorter path from the activated mesh to the auxiliary electrode. It will be understood, however, that this modification is not necessarily tied up with the use of the refractory rim 85a but in fact the cup 80, 80a, etc., may be on the inside of the wire mesh or may be omitted entirely in any one of the examples illustrated. A similar result may be achieved by placing a grid of tungsten, etc., over the electrode, or otherwise including a refractory metal in the fabric of the electrode.

It is not essential that nickel or other neutral metal should be included in the electrode structure. On the contrary I have obtained good results with tungsten alone as the carrier metal of the electrode, but I prefer to use nickel or equivalent metal to support the activation material where operating conditions permit.

Another feature of the electrodes shown in Figs. 13 and 15 which is of special advantage is the shape, tapering toward the axis in the direction of the discharge, as in the spherical form shown in Fig. 13 and the conical form shown in Fig. 15. This tapering form tends to hold the discharge at all times centered within the tube and to prevent its wandering over the surface of the electrode. This is particularly important in lamps which are designed or intended for horizontal burning, since in the horizontal position the wandering of the arc to the upper edge of a flat electrode may bring it between the electrodes too close to the wall of the envelope. This is especially important with lamps which are designed to operate at voltages higher than those encountered in using ordinary 110 volts supply line.

Due to the difficulty of determining exactly what occurs within a sealed tube there has been a great deal of uncertainty about electrodes and the proper construction and chemical treatment and even as to their electrical activity during the operation of devices of this type. It had been determined prior to my invention that resistance heated electrodes when coated with certain oxides (the so-called Whenelt electrodes) were increased in electronic emissions. It had not been known before my invention that any improvement was made in such electrodes by an activation coating so far as cold starting of arc electrodes was concerned and these electrodes had always been heated by a resistance current necessitating special circuits and additional lead-in wires as well as the resistance element itself, all of which increased the cost very considerably and constituted the weakest link in the construction where failure is most likely to occur.

Alkali metals have also been amalgamated with mercury in pool electrode type of lamps, in which it serves to decrease the electrode drop.

In the type of lamp discussed in the present application it is desirable to do away with all resistance heating of the electrode and at the same time it is essential to use solid electrodes. This I have been able to achieve after careful study of electrodes and their operation by a special activation. I have found that the electropositive metals, such as the alkaline earth metals, if properly combined in the electrodes will render them emissive even when cold so that the lamp in which they are included may be started without resistance heaters or other heating devices and will be self-heating, i. e., the electrodes after starting the discharge will be heated directly by the action of the discharge itself. Thus with the lamp as shown in Fig. 1 for example, a small glow discharge is first formed between the electrode 42 and the auxiliary electrode 63 or starting strip 57. This discharge quickly ionizes the gas to a point at which the path between electrodes offers less impedance than the path through the wall of the envelope 40 (acting as the dielectric of a condenser) and the principal discharge is transferred therefore to the path between the electrodes. As the discharge continues it rapidly heats the electrodes until the point is reached at which the initial glow discharge is automatically converted into an arc discharge. Thereafter the temperature of the electrodes is maintained by the heat of the discharge.

The electrodes used for this purpose are not oxide coated electrodes of the Whenelt type although in their manufacture they are coated with oxide. The action which makes possible the operation as just described is dependent upon an intense reduction of the electrodes after the tube in which they are mounted is sealed from the atmosphere. For example in the preferred embodiment of my invention the electrodes are coated with barium oxide, preferably an oxide having a high content of water of crystallization. The tube is made with the thus coated electrodes and is sealed except for the pumping connection. Through this connection the tube is evacuated by pumping in the usual way. The electrodes are then subjected to intense heating, e. g., by means of eddy currents induced therein by a high frequency machine commonly called a "bombarder." During this or some other equivalent preliminary heating the pumping is continued to exhaust any gases which are released by the heat treatment, and this pumping should preferably be continued throughout the electrode treatment until the lamp is finally filled with the gas and vapors which are to serve in the use of the lamp.

This preliminary heating is carried to preferably just under 1000° C. or to a temperature just below that at which the nickel or other electrode metal would begin to vaporize. A higher temperature may be used and the activation of the electrode would be entirely satisfactory, but the tendency of the tubes to darken by vaporization of the electrode metal would be increased. If this preliminary heating is not intense enough the electrodes will not be sufficiently activated for the subsequent treatment by the discharge, and unless great care is taken they may be fused so badly as to be spoiled in the subsequent treatment.

The initial heating treatment may not and advantageously does not completely reduce the electrode; and it is, therefore, subjected to a further treatment by passing a discharge through the lamp while the pumping is continued. At this stage a gas, preferably one of the rare gases, is allowed to enter the tube to carry the discharge therein, and a stream of this gas preferably is continually exhausted from the tube by the pumping.

I have found that in a filling of such a gas the discharge can be made to set upon the entire electrode and thereby to give uniform activation. Mercury vapor, which is superior in many respects for this treatment, tends to hold the discharge to one spot on the electrode and thereby to interfere with uniform activation, but mercury can be used to advantage at the end of this stage of the treatment.

One example of this is shown in Figure 32 where a supply of mercury is provided in the flask 71 which may be heated during the pumping to supply mercury vapor to the envelope 40 a condenser 73 around the pumping connection 74 condenses any mercury which enters that connection and keeps it from passing over to the pump.

I prefer mercury vapor for this final discharge treatment because its ions are heavier and therefore produce a more intense bombardment. Furthermore, the mercury can be gradually vaporized either by the heat of the discharge or by externally applied heat, and thus a stream of its vapor may serve to sweep impurities out from the tube, and gradually take over the discharge from the gas.

During this final treatment the electrodes are overloaded, i. e., are subjected to a current greater than that of normal operation, so that the surface of the electrode is heated to a yellow or yellowish white heat.

The preliminary heating may be done in other ways, and in fact can be combined with the treatment by the discharge; but it is difficult to get satisfactory initial heating of the electrodes by the discharge until they are at least partially activated. For this reason the electrodes are preferably brought to a glowing temperature by other means, e. g., by high frequency or resistance heating, unless they have been substantially activated by a pretreatment.

The action of the discharge effects a further reduction of the barium oxide at the surface of the electrode and leaves it with a metallic grey appearance which apparently is caused by the particles of reduced free metallic barium. I believe that these particles of free metallic barium are isolated from the carrier metal, e. g., nickel by a certain amount of unreduced barium oxide or sub-oxide or other compounds. This seems to be important, since I have found that an alloy of nickel and barium cannot serve as the full equivalent of the reduced electrode as just described. The oxide, sub-oxide or other barium compounds apparently serves as a reservoir of activation material, thus prolonging the useful life of the electrode. If at any time the activation should be impaired the electrode begins to overheat and a new layer of barium is thereby reduced. Thus fresh activation material is automatically produced as required, yet at no time is there an excess of barium which would be vaporized from the electrode.

Other reducible barium compounds may be used, and other electro-positive materials, especially reducible alkaline earth compounds. Furthermore the reduction may be effected in other ways. As for example, solely by a high frequency heating, in which case it would have to be continued for a very long period of time at a very high temperature, and even then the reduced electrode would not be quite as satisfactory as the electrode produced by the method as just described. Also the entire reduction may be effected by direct action of the discharge upon the electrode, e. g., starting the discharge by means of high tension or high frequency ionization and continuing it under conditions to effect the desired heating of the electrode.

In any case, I have found that the most active electrode results if the reduction treatment is just short of eliminating all of the separable oxygen. For example, when the electrodes are treated as specifically described above, a small amount of oxygen is given off from the electrodes after the lamp is completed and during the first few hours of its operation. As a result a slightly yellowish deposit, probably of mercuric oxide, is formed on the inside of the envelope, but this deposit is quickly cleared up, presumably by reabsorption of oxygen by the cooler parts of the electrodes, and it will be found that a lamp which initially produces this yellowish deposit, due to the better activation of the electrodes and consequent reduced tendency of the electrodes to vaporization, will burn for a very much longer time before any darkening of the enevelope appears.

Auxiliary electrodes and shields

I have mentioned above and illustrated in Fig. 5 the use of auxiliary electrodes to provide a shorter and consequently a lower voltage path for starting the discharge. The auxiliary electrode shown in Fig. 5 is of a very simple form, but one which has proven entirely satisfactory to give low voltage starting.

It is not essential that this auxiliary electrode be given any particular form or location and as shown in Fig. 5 both have been chosen primarily for ease and economy of manufacture. I have found, however, that certain advantages may be attained with special forms and/or positioning.

I have found, for example, that it is better to space the auxiliary electrode from the main electrode a distance at least equal to the mean free path in the filling at starting.

With the auxiliary electrode placed as shown in Fig. 5, its circuit may be opened after starting or it may be connected through a resistance such that during operation there is only an insignificant current passing to the auxiliary. In the latter case such current is wasted, but is so small that it can be ignored. If, however, the auxiliary electrode is made in the form of a shield 63a, e. g., as shown in Figs. 35 to 37 the charge maintained thereon may serve to limit the passage of electrode material which would cause darkening of the envelope and consequent reduction of efficiency if it were to reach the walls of the principal luminous portion of the tube. Such shields are preferably fitted as close to the discharge as is possible without so far overheating the shield itself as to cause darkening of the envelope therefrom. In this way the shield is made to intercept the particles of electrode material which may be thrown off from the electrode and to prevent their deposit upon the wall of the central luminous portion of the envelope.

The action of such shields is apparently two fold. First the cooler surfaces of the metal shield tend to condense any vaporized solids from the electrode before they pass to the central luminous portion of the envelope. This effect may be taken advantage of whether or not the shield is charged, and I have found that even an uncharged shield of the types illustrated will materially reduce the darkening of the envelope.

Secondly, there is the effect of the charge which by attracting the particles which would cause the darkening causes them to be deposited upon the shield instead of upon the wall of the envelope or by repelling particles of like charge serves to limit their passage into the central luminous portion of the envelope and to restrict them to the pole vessels. These shields may be connected through a resistance to the adjacent main electrode, but preferably are connected to an opposite electrode as already described so as to serve the double function of shields and auxiliary starting electrodes.

In Fig. 35 I have shown the resistance 67a mounted on the support wire 50 and held between the glass or silica, etc., seal at one end and a retainer, e. g., a short wire spot welded to the wire 50 at the other end. This forms a compact way of mounting the resistance shown diagrammatically at 67 in Fig. 5. These resistances may be, for example, one of about 1000–2000 ohms for lamps of the sizes herein specifically mentioned, and in general should be as high as will permit a good starting discharge so that the "leakage" discharge to the auxiliary electrode during operation will be minimized. If the resistance is too high starting will be difficult or impossible and if too low, the efficiency of the lamp will be impaired.

Fillings

These lamps embodying my invention and especially as shown in the accompanying drawings and as described above, may be used with fillings of fixed gas or of vaporizable substances or preferably of both. Many of the advantages of my invention, including especially those of convenience, of universal applicability in place of incandescent lamps and of long life, etc., may be secured with a moderate or low pressure, e. g., consisting only of a rare gas, such as neon, argon, helium xenon, krypton, etc., but such lamps do not have the high efficiency of those which combine such gas and a metal vapor in the filling. On the other hand, many of the advantages including simplicity, universal application, etc., and including high efficiency may be obtained with a filling of only a vaporizable material such as mercury, cadmium, sodium, zinc, rubidium, etc., but such a lamp would be difficult to start and would require special electrical apparatus such as heaters, high frequency apparatus or high tension transformers in order to effect starting. By combining a low pressure of a fixed gas with a provision of a vaporizable substance such as mercury, greater ease of starting is attained than is possible with either alone, and greater efficiency is secured.

The pressure of the fixed gas used in this way is very important, as the voltage at which the lamps will start is largely dependent upon this pressure. I have found that, as the desired starting voltage is reduced, the pressure of the fixed gas which is necessary is increased and the range of permissible variation is greatly reduced. Thus the lamp made for operation from a 220 volt line may start directly from the line without voltage increasing devices with a pressure of from 2 to 20 mm. of argon and the saturated vapor pressure of mercury at atmospheric temperature, whereas if the lamp is to start on a 110 volt line the argon pressure should be between 8 and 14 mm.

If inductive starting devices are used as hereinafter described, pressures beyond the specified range may be used, since momentarily much higher voltages are then available for starting.

Ordinarily the pressure used will be near the bottom of the range in order to economize on the amount of the rare gas used or near the center of the range to get the minimum starting voltage. Thus for a 220 volt lamp a pressure of 4 to 6 mm. will ordinarily be used, whereas in a 110 volt lamp a pressure of 10 to 12 is best.

I have found that the gas pressure must be increased somewhat as the wattage of the lamp is reduced. Thus a 100 watt lamp should have about 18 mm. of argon. This is probably because of the larger percentage of absorption and "cleaning up" in the smaller lamps.

The pressure also depends upon the particular gas used. Thus the heavier the gas, the smaller the pressure required. The approximate typical ranges which I have found best for the various rare gases in lamps designed for operation from 110 and 220 volts lines are as follows:

|  | 110 v. | 220 v. |
|---|---|---|
|  | mm. |  |
| Helium | 24 to 42 | 12 |
| Neon | 16 to 28 | 8 |
| Argon | 8 to 14 | 2 |
| Krypton | 4 to 7 | 1.5 |
| Xenon | 2 to 3 | 1.0 |

For 220 volts only the lower limit is given as the range is wider and as a matter of economy the upper part of the range would be of no practical interest.

For higher voltage lamps the range may be widened more or less proportionately for the various gases. This is shown more graphically in Fig. 34 of the drawings in which a series of curves are plotted showing the starting voltages against pressure for the various gases. By following the abscissa corresponding to the starting voltage available for any given lamp the range of pressures of the various gases which may be used will appear directly from this graph. It should be understood that these curves have been drawn from incomplete data and cannot be taken as absolutely accurate throughout their length, but their general form is approximately accurate and they illustrate graphically how the pressure should be determined.

The amount of the vaporizable filling is also very important. Mercury vapor lamps, as made prior to my invention, have been extremely sensitive to conditions affecting their temperature and much difficulty has been experienced in maintaining a pressure of the mercury vapor which would permit the realization of maximum efficiency, because of the danger that a temporary increase in voltage or some other condition raising the temperature of the lamp would so far increase the vapor pressure of the mercury as to extinguish the lamp. In the lamp embodying my invention this difficulty is controlled by providing a limited amount of the vaporizable material and then designing the lamp so that all of this vaporizable material is vaporized below the normal operating temperature. This permits the maintenance of approximately maximum efficiency and obviates the danger of extinguishing the lamp with fluctuating conditions during operation. Where materials which vaporize at temperatures higher than that of mercury are used this becomes even more important.

I have used the term "vaporizable" because best results have been obtained with materials like mercury, cadmium, sodium, etc., which actually vaporize. The important fact however, is that a gas is released in the filling during the discharge and is withdrawn from the filling when the lamp is cold. This could be by absorption or chemical reaction or in other ways than condensation and vaporization.

When mixed fillings are used comprising several materials which vaporize at different temperatures and which are soluble one in another, a new problem is introduced which had not been fully understood prior to my present invention. Thus although it has been suggested to use mixed metal fillings in luminous discharge lamps, it has been stated in the literature that the addition of cadmium for example, to a mercury lamp greatly reduces the light output or the luminous efficiency; and, so far as I am aware, no one prior to my invention has obtained high efficiency with the high vaporizing temperature metals either alone or in mixture with mercury.

I have now found by experiment that it is not necessary that there should be any serious reduction in efficiency when the higher vaporizing metals are used and if the lamps are properly made. The efficiency, however, is dependent upon the maintenance of high pressure and it is in this respect that others apparently have failed to achieve the intended results. I have found for example that when cadmium is added to a mercury vapor lamp that the cadmium forms an amalgam with some of the mercury and thereby reduces the vapor pressure. It is necessary, therefore, to operate such a lamp at higher temperature in order to attain the same efficiency as with mercury alone. The same is true of other metals such as rubidium, zinc, etc., which form amalgams with mercury.

This tendency to reduce the vapor pressure by amalgamation at high temperature may be taken advantage of in lamps which require quick restarting. Even a small amount of a metal, e. g., cadmium which forms an amalgam will very greatly shorten the period for restarting of a high pressure mercury vapor lamp.

As more fully discussed above, it is essential, furthermore, that the lamp should be designed so as to leave no cool areas in which these high condensation temperature metals may condense upon the wall and be protected from the heat of the discharge so as to be withdrawn from the vapor filling. If this should occur the pressure within the envelope would be reduced and the efficiency would be correspondingly impaired. With a lamp constructed for example as shown in Fig. 16 and operated so that all parts of the envelope walls are maintained above about 500° C. and with a filling of cadmium and mercury together giving approximately atmospheric pressure, I have obtained a lamp giving an excellent white light and an efficiency of upwards of 45 lumens per watt.

*Color*

If the color of the lamp radiation is to be accurately controlled it is of course necessary to control the amount of the various metals which are included in the filling. The higher boiling point metals whose vapor pressures are low at the operating temperatures of the lamps, and therefore cannot seriously alter their operation with normal fluctuations need not be so accurately controlled, but may be supplied in excess, especially when they are minor constituents of the vapor filling. I have found that the amounts can be very accurately controlled by adding the vapors of these materials while the lamp is operating on a metered circuit. Thus, for example, a lamp can be made to operate on 110 volts with the mercury limited to 35 volts, i. e., after the lamp is started on the filling of the fixed gas and while the lamp is externally heated to the operating temperature, mercury vapor is filled into the envelope until the meter shows a voltage drop on the lamp of 35 volts. Then cadmium vapor is inserted until the meter shows a drop of 50 volts and thereafter a third metal such as bismuth may be inserted in vapor form until the lamp shows a drop of 80 volts. The remaining 30 volts, of course, represent the ballasting device. In the same way controlled amounts of any number of materials may be added. In this way it is possible to exercise very accurate control over the intensity of the various spectral lines and, e. g., to produce lamps giving a very close approximation of perfect white light. Another combination which gives an excellent white light is mercury with cadmium and sodium in small amounts to correct the red and orange yellow deficiencies respectively.

By suitably choosing the filling material or combining various materials in the same filling a large variety of colors may be produced.

It has been suggested above in connection with Fig. 21 that white or other desired colored lights can be readily obtained by use of a plurality of luminous discharges in series. In that case both discharges were within the same jacket and as will be observed this arrangement is particularly desirable because of the intimate mixing of the two types of radiation. Similar results, however, can be obtained by mounting separate discharge lamps within a common reflector or even independently so that both radiate light to the same area where the mixed light is desired. In any of these cases the several discharge paths may be connected in series and operated from a common ballasting or current limiting device. The proportioning of the various colors may be obtained by suitable proportioning of the relative voltages of the several lamps so as to give greater or less intensity to the discharges which give the various colors according to the proportion of those colors which is desired. The voltage may be controlled for this purpose as already described above in the general discussion of the design and proportions of lamps, e. g., by varying the distance between electrodes or by varying the pressure of the filling. If greater adjustments of color are required than can be made in this way, the several lamps may be connected in parallel each with its own current limiting device and one or more of these devices may be made adjustable to increase or decrease the proportions of light from the discharge associated therewith.

In all cases where several lamps are used in series and connected through a current limiting device to a line at approximately constant voltage the sum of the voltages of the several lamps should not exceed about three-quarters of the line voltage. Thus with a mercury and neon combination I have obtained good results using a 30 volt mercury lamp and a 40 volt neon lamp connected in series with a choke from 110 volts A. C.

Automatic substitution

When lamps made according to my invention are connected in multiple from a line each must have its own current limiting device if they are to operate simultaneously since otherwise the first lamp to start will short the circuit and prevent the parallel lamps from starting. This characteristic I have taken advantage of for effecting automatic replacement of lamps which fail or are temporarily extinguished during service. Thus in street lighting or beacon work, etc., where it is important that the lamps should be lighted at all times, two lamps may be mounted in the same fixture and connected in parallel, e. g., as shown in Fig. 25. The one of these which has the lowest starting voltage will ordinarily operate, but if for any reason it should fail to do so then the lamp which has the slightly higher voltage will start and will take the place of the one which is out.

It is one of the characteristics of the high pressure vapor lamps that after they are heated to operating temperature the break down voltage of the lamp has so far increased that it can no longer start on the ordinary line voltage. Thus if there should be a temporary failure in the current supply the lamp would be extinguished until the filling has sufficiently cooled to reduce the pressure to a point at which the line voltage could again start the discharge. This difficulty can be overcome in various ways, e. g., as described below in connection with series circuits but the use of two lamps in parallel as shown in Fig. 25 is much the simplest way of treating this problem. With this combination, as soon as current is again supplied to the line the second lamp which will be cold because it had not been operating before will be promptly started and will continue to burn until another temporary or intentional failure of the current in the line may cause the lamp to be extinguished. Meanwhile the first lamp has been cooling so that it will then be ready to start again if and when the second lamp is extinguished.

In Fig. 25 I have shown diagrammatically a standard street lighting fixture 90 in which is a screw socket 91 intended to receive an ordinary incandescent lamp. At 92 I have indicated diagrammatically by an X a current limiting device. This may be a resistance or a choke on multiple circuits or may be the transformer in series circuits or in isolation transformer circuits. Except for the addition of this current limiting device 91 in cases where the transformer already in the circuit cannot serve this purpose, the fixture may be identical with those commonly used in incandescent street lighting. Into this fixture I have inserted a double socket 92 with parallel connections and each socket of the double socket carries a lamp 93 or 93a. The lamp 93 is mounted along the focal axis of the fixture so as to give a symmetrical light distribution for which the fixture is designed and this lamp is designed to start at a slightly lower voltage than the lamp 93a. If for any reason the lamp 93 should fail the lamp 93a would start at once and thus there would at all times be adequate lighting, but whenever the lamp 93a is burning the light distribution would be unsymmetrical and thus it would be evident to anyone even casually examining the fixture that the substitution had occurred. In street lighting work this is particularly important since it permits maintenance of a large number of fixtures without examining the fixtures any more than to ride down the street between the lighted lamps.

This same combination may also be used for intermittent lights, e. g., in advertising work. Thus if the two lamps are of different colors the change from one color to another may be effected without any complicated switching apparatus and merely by interrupting the circuit for an instant at intervals sufficient to permit the cooling of one of the lamps to a point at which it is again ready to start. Even the interrupting may be done automatically if the lamps are provided with an excess of vaporizable material and insulated or overloaded so that the vaporization will continue to the point at which they are extinguished by their own increase of pressure. With such lamps, the discharge is started in one lamp and continued until the pressure is reached at which it is extinguished, whereupon the next lamp in the series is started and burns to its extinguishing point. Each cools while another is burning, and if more than two are used in parallel a definite order of rotation can be maintained by designing them so that only one lamp can have cooled to minimum voltage starting temperature during the burning period of one lamp. If the interval is shortened a series of more than two lamps may be similarly located.

*Current limiting and voltage increasing devices*

I have already referred to the necessity for limiting the current supplied to the lamps of my invention. Since in ordinary practice these lamps will be connected to lines provided with practically unlimited current supply it will ordinarily be necessary to provide some kind of current limiting device in series with the lamp. This current limiting or ballast device may take the form of a resistance, of a reactance such as a choke coil or other self inductance or a constant current transformer or any suitable impedance in the circuit. The advantage of using incandescent filament as ballasting resistance, especially in direct current operation has already been discussed above in connection with Figs. 17 to 19. In circuits designed for incandescent lamps this combination within one lamp as shown in Figs. 17 to 19 is particularly advantageous because it can be substituted directly without any change in the circuit. I have also found that in circuits designed for incandescent lamps in which a fuse is provided for each lamp or for several lamps in series, the discharge lamp of my invention, even without the self-contained resistance can be substituted directly in the circuit, provided that a fuse having a suitable resistance or other current limiting means is used in place of the ordinary lead fuse. An incandescent lamp of the proper size can serve this purpose or, of course, a low temperature resistance may be inserted in the line, e. g., where two fuses are used in the normal line one of these may be replaced by such resistance and the other will in such case still protect the line, or a second fuse receptacle can be connected in series with the fuse already provided, and the resistance inserted at this point without any serious disturbance of the circuit. If at any time it is desired again to substitute incandescent lamps for the gaseous discharge lamps of my invention, this can always be done by merely replacing the resistance plug or incandescent lamp with an ordinary fuse plug whether it is in the normal fuse receptacle or in an additional receptacle placed in series therewith.

While these expedients are entirely satisfactory so far as the operation of lamps according to my invention is concerned, I have found that the use of an inductive current limiting device is not only no less satisfactory for limiting the current when alternating or rapidly fluctuating current is used, but also may serve by its induction to provide a very high voltage in the moment of starting. Thus with practically no complication of the circuit beyond that which is required in any case, I have found that the special precautions and difficulties which are involved in the design and construction of lamps which will start under all conditions and normal line voltage fluctuations may be avoided and the initial start or break down may be accomplished by a voltage which instantaneously is very much higher than the line voltage due to the inductance of the circuit. The lamp once started drops immediately to a very low voltage and (with vaporizable fillings) again gradually goes back to a higher voltage so that this instantaneous kick at high voltage is all that is necessary to initiate the discharge of the lamp.

These expedients also make possible the use in 100 v. lamps of fillings, e. g., Ne, He, Hg–Cd, etc., which do not start readily on 110 v.

In Fig. 23 I have shown diagrammatically, a circuit for these lamps embodying my invention which is adapted to give both a ballasting, or current limiting, effect during operation and a very high voltage at the instant of starting. It will be appreciated of course that, in this figure, no attempt has been made to preserve the proportions of the several parts of the circuit, the scale of each part being chosen for convenience in illustrating its essential features rather than for its actual proportion to the other elements of the circuit.

In this figure the lamp is shown diagrammatically at 100, the electrodes of this lamp are connected through the lead-in wire 43 to one side of a supply line or other current source and through the lead-in wire 44 and the choke coil 101 to the other side of the line, etc. These connections are indicated at 102 and 103 respectively, the line itself not being shown on this figure. The choke coil 101 is of course designed to provide the desired impedance for the particular lamp 100 which is used in the circuit. For a mercury vapor lamp operating at high pressure and high efficiency this choke coil would preferably be such that the lamp receives about three-quarters of the line potential. Across the electrodes in parallel with the lamp I have connected a shunt 104 controlled by a switch or contacting device 105. Assuming now that all connections other than the shunt 104 are closed from the current source to the electrodes of the lamp, the potential may still be insufficient to start the discharge within the lamp. In this case the shunt 104 may be established by closing the contact 105, and thus for an instant the entire line voltage may be passed through the choke coil 101. The shunt connection may then be broken as rapidly as possible and due to the self inductance of the choke coil 101 a very high potential will be instantaneously created across the lamp which serves to start the discharge within the lamp 100. The discharge once started will, as already stated continue at very much lower voltage.

The production of this instantaneous high starting voltage may be intensified further by use of a condenser or other capacity in the circuit as shown at 106 and its effectiveness increases as a transient resonant condition is approached or encountered. As the capacity of the condenser is increased, its series circuit with the ballasting inductance increases the voltage across the lamp in the steady state of the circuit due to its change toward a resonant condition.

So far as the operation just described is concerned it is unimportant how the circuit breaker 105 is operated except that the more suddenly and completely the shunt circuit is broken the higher will be the instantaneous potential to which the lamp is subjected. Thus in numerous installations I have used simply a push button or other manually controlled switch to make and break this shunt connection. In Fig. 23, however, I have shown a magnetically controlled contact in which the armature 107 is attracted by the pole pieces 108 and 109 of the choke coil. The contact 105 being normally closed, the current when first turned into this circuit will pass through the choke coil 101 and through the shunt 104 until the poles of the choke coil are sufficiently magnetized by the current passing through the coil so that the armature 107 is drawn down over the gap between the pole pieces 108 and 109, whereupon the shunt connection 104 is broken and the high starting potential is thereby induced as already described.

This magnetic operation is especially useful for restarting lamps while they are still hot. After the lamps have once been heated sufficiently to vaporize the mercury or other filling, the voltage of the lamp is greatly increased, and if then the discharge ceases so that the vapors are de-ionized it cannot be reestablished at the line voltage until the vapors have been condensed by cooling of the lamp. This is true even of lamps which when cool will start uniformly at the line voltage. Without any voltage increasing device this cooling must require a fairly long time before the lamp can be used again, the inductive circuit as just described may shorten this period by providing an increased starting voltage. Except when it is practicable to provide a super voltage sufficient to effect immediate restarting, a manually controlled voltage amplifier would be somewhat of a nuisance since one might keep trying whether the lamp would start for some time before it had cooled. The automatic switch by repeated tries starts the lamp at the first instant when it has become cool enough and thus minimizes the period of inoperativeness. With this magnetically controlled shunt as shown for example in Fig. 23 the device will continue to make and break giving repeated peak voltage or high tension "kicks" until the lamp starts.

The maximum voltage attained in this way depends upon the value of the inductance and the abruptness with which the shunt is broken (the $di/dt$ of the circuit). It is desirable therefore to use contacts which will give a maximum abruptness, e. g., vacuum circuit breakers, mercury switches, multiple contact switches, etc. For this same reason I have found it advantageous to use an automatic breaker, such as a relay, buzzer, or the choke-operated breaker as shown in Figs. 23 and 24 rather than manual switches, because the former will generally be operated more abruptly.

If a simple relay or buzzer is used in the shunt connection provision must be made for opening it when current flows through the lamp, e. g., by another relay or a thermal switch responsive to heating of the lamp or some other element in its circuit. The choke operated relay of Figs. 23 and 24 will of course be held open by the magnetism of the choke whenever current flows in the circuit.

In Fig. 24 I have shown a fragmentary view illustrating another mercury switch type of contacting device to control the shunt connection 104a. In this case the contact is made by a pool of mercury within the switch 105a. When tilted to the position shown in Fig. 24 the mercury pool contacts between the electrodes and closes the circuit. When, however, the armature 107a is drawn up against the pole pieces 108 and 109 the tube 105a is tilted so that the pool of mercury flows away from the electrodes and breaks the shunt circuit 104a. In this case the contacting device is held in the closed circuit position by gravity instead of by spring tension as in the case illustrated in Fig. 23.

In the case of a manually controlled switch it will ordinarily be held in the open circuit position and closed by the manual pressure instead of the contrary arrangement as shown in Figs. 23 and 24. This I have illustrated diagrammatically in Fig. 31.

Additional capacity may be provided as shown at 110 between the connections 103 and 102, thus being shunted across both the lamp and the choke, to improve the power factor of the circuit.

This circuit as just described is of course primarily designed for alternating current operation in which case the choke 101 serves both as a current limiting device and as the self-inductance or reactor to provide the very high starting potential. With direct current, the choke coil 101 will not of course be sufficient as a current limiting device, but nevertheless this circuit is desirable as a starting device even with direct current. In such case a resistance or other suitable current limiting device must be inserted in the circuit, e. g., at 111. In fact I have found that it may be more important to use such an inductance or other device for increasing the starting potential with direct current providing only a steady 110 volts than with alternating current which at the peak of the wave may have as high as 165 volts.

The choke, or other current limiting device, should of course in each case be proportioned according to the lamp and the line voltage with which it is to be used, i. e., so that with the lamp operating normally the choke, etc., will provide from the line a limited current at the voltage for which the lamp is designed and intended to operate. With high pressure mercury vapor lamps I have found that the current limiting device should ordinarily absorb one-quarter to one-third of the line voltage leaving three-quarters to two-thirds of the line voltage to be used by the lamp in normal operation. This means of course that for each lamp of a different size, i. e., of different voltage or current requirements, a different current limiting device must be used or the current limiting device must be made adjustable. I have found that for this purpose a very satisfactory way of providing for the use of different standard size lamps is to provide a tapped choke having a plurality of connections each corresponding to a standard lamp size.

If high pressure lamps are ballasted by reactances which are approximately saturated under the conditions of normal operation, they may be brought to the full voltage and intensity more quickly because such a ballast permits overloading during the heating up period.

in the accompanying table I have shown the operating current, the line voltage and the voltage and wattage of the lamp and choke respectively for a series of representative lamps.

| Lamps | Operating current | Line voltage | Voltage of lamp | Voltage of choke | Total watts | Lamp watts | Choke watts |
|---|---|---|---|---|---|---|---|
| 110 v. 100 w. Ar Hg | 2.2 | 123.5 | 70 | 91 | 135 | 120 | 15 |
| 110 v. 200 w. Ar Hg | 3.45 | 122 | 73 | 87 | 235 | 220 | 15 |
| 110 v. 300 w. Ar Hg | 4.9 | 121 | 73 | 87 | 338 | 308 | 30 |
| 110 v. 400 w. Ar Hg | 6.3 | 120 | 75 | 80 | 435 | 405 | 30 |
| 110 v. 500 w. Ar Hg | 6.3 | 122 | 91 | 70 | 545 | 510 | 30 |
| 110 v. 250 w. Neon | 7.7 | 121 | 27.5 | 109 | 305 | 250 | 55 |
| 110 v. 500 w. Ar Cd-Hg | 7.8 | 118 | 66.5 | 95 | 495 | 460 | 35 |
| 220 v. 400 w. Ar Hg | 3.4 | 214 | 138 | 148 | 418 | 403 | 15 |
| 200 w. ⎫ | | 38.3 | 38.3 | | | 210 | |
| 300 w. ⎬ Series | 6.6 | 52.6 | 52.6 | | | 305 | |
| 400 w. ⎭ | | 68.3 | 68.3 | | | 395 | |

The capacity used in the circuit shown in Fig. 23 is a means of increasing the instantaneous voltage at starting which may be used independently of the other features shown in Fig. 23. When combined with an inductance suitable for ballasting the discharge of the lamp a capacity of the order of 1 to 10 microfarads gives, before the lamp starts, the equivalent of a series approaching resonance so that the voltage across the condenser, which is the voltage applied to the lamp at starting, is higher than the applied line voltage. Up to the point of resonance the effective starting voltage available to the lamp may be increased by increasing the capacity of the condenser used.

In the particular arrangement shown in Fig. 23 the condenser serves the double purpose of reducing the sparking and increasing the effective voltage across the lamp.

As one example of a specific circuit embodying the features illustrated in Fig. 23, the 250 watt 110 volt neon lamp referred to in the table given above may be connected to the 110 volt A. C. line through an inductive reactor of 9 to 10 ohms impedance with a condenser 106 of about one microfarad across the lamp.

Another advantage of the circuit as shown in Figs. 23, 24 and 31 is that it provides a very simple way of combining these starting and ballasting features with a manual control for the lamp. For example, if in Fig. 31, the lamp 100 is made and designed to start at a voltage slightly above the maximum voltage which would normally occur in the line, the switch 105b may serve both to turn off and to turn on the lamp and in conjunction with the reactor 101 to provide the high starting voltage which assures starting under all conditions.

Assuming that the lamp is operating in such an arrangement the closing of the shunt 104 at 105b will of course short out the lamp and will result in extinguishing the lamp while the shunt is closed. When the shunt is again opened the lamp will not restart because the gaseous filling within the lamp will have become deionized and the break down voltage between the electrodes will therefore be substantially above the line voltage to which a lamp would be subjected at the opening of the switch 105b. The opening of the switch will of course produce the high tension "peak" which would be sufficient to start the lamp if it were cold but since the lamp is hot and filled with the metal vapor at high pressure, if the circuit is properly designed the lamp will not be restarted at this time. However, after the lamp has cooled if the shunt connection is once more closed for an instant at 105b and then reopened the lamp will start immediately. Thus either to turn on the lamp or to turn it off again it is only necessary to touch the push button or other switch 105b for an instant. This affords a particularly advantageous type of circuit where a single lamp or group of lamps in series are to be controlled from switches at several different points. At any point where it is desired to place a control switch it is only necessary to place a shunt across the lamp with an open circuit switch since all of these switches will normally be open any one of them will at any time be capable of turning the lamp either on or off regardless of where the circuit was last turned on or off.

Series circuits

The lamp, as made according to my invention, may be combined with particular advantage in series and transformer circuits such as have been used in common practice, especially for street lighting purposes. One such circuit is shown in Fig. 26. In the case illustrated the current is supplied to the series line 115 from a constant current transformer 116. In this case the constant current transformer serves to limit the current supplied to the line and since the lamps are in series there is no need for any further ballasting device. In this figure the lamps are represented diagrammatically by X's, 100. In the simplest form of circuit there will be simply a number of lamps in series along the line. In the Fig. 26, however, I have shown the circuit divided to facilitate starting of the lamp.

In the simple series circuit there may be difficulty in starting the lamp, particularly when the atmospheric temperatures are very cold, so that the vapor pressure of the mercury is practically eliminated, or if the lamps are hot, e. g., after a temporary failure in the line. Thus a starting voltage of as much as 4 to 6 times the operating voltage may be required. If the constant current transformer 116 is designed with this problem in mind it is possible and practicable to provide for this increased voltage by means of the transformer, but ordinarily where these lamps are to be substituted for incandescent lamps in street lighting circuits, it will be found that the transformer is not of a type which is capable of supplying this greatly increased voltage at starting. I have found it advantageous, therefore, to provide for the increased voltage at each lamp by temporarily cutting out certain sections of the line during the starting. In Fig. 26 I have shown this as being accomplished by the relays 117. I have found that by dividing an ordinary circuit into two or even three parts and starting each separately that the ordinary constant current transformer will take care of the slight additional voltage required to start these various banks. For example, in Fig. 26, the first bank consists of ten lamps, the second of eight and the third of six. When these lamps are to be started the second and third banks are at first shorted out by their respective relays 117 and 118. The full voltage of the transformer is therefore applied onto the ten lamps of the first bank and they are readily started by this voltage. As soon as these lamps are lighted and a substantial current begins to flow through the relay 117 and the shunt 119 the relay 117 is opened whereupon the full voltage of the transformer is connected across the first two banks of lamps. Since the ten lamps of the first bank are already started, however, their voltages will be at a minimum and, in the case of metal vapor lamps, will be substantially below their operating voltages. Thus the voltage per lamp of the eight lamps of the second bank may be approximately as great as that applied to the ten lamps in the starting of bank No. 1. As soon as the second bank is started the increased current flowing through the relay 118 and the shunt connection 120 opens relay 118 whereupon the third bank is started.

The circuit can be divided into two, three, four or more banks, depending upon the voltage capacity of the transformer and the convenient point or points of division for the circuit.

In Fig. 26 I have shown the use of a relay for shorting and subsequently opening the successive portions of the circuit. This, it should be understood, is merely representative of any of a large number of well-known devices which can be used for this purpose, including photoelectric devices and heat responsive devices. A device which I have found particularly satisfactory because it is entirely automatic, is to use a condenser, e. g., as shown in Fig. 28 of capacity such that it will short out one group of lamps until the other group is started, whereupon the change in the balance of the circuit will result in the voltage being applied across the second group. It is to be understood that the successive groups of lamps can consist of any number and for example, in Fig. 27, I have shown a circuit in which each lamp is shorted through a condenser, the successive condensers being of progressively varying capacity such that the lamps are lighted successively, thus constituting what may be described as a cascade circuit, the light striking progressively down a line of lamps one at a time until the entire line is burning.

In series circuits of this type, as commonly used for street lighting, etc., it is customary to use film cut-out sockets so that the continuity of the line may be preserved, even if a lamp should burn out. If such film cut-outs are used with the metal vapor lamps of my invention, it should be remembered that in case of a temporary failure in the line the lamps may be extinguished even though they are in perfect condition and that they will not start at any normal voltage until they have cooled. It is important therefore that such film cut-outs, if used with these lamps, should have a break down voltage higher than the break down voltage of the lamp. Otherwise, before the lamps can be started, the cut-outs would be broken and the line would become inoperative.

A more desirable type of circuit for use with the lamps of my invention is the isolation transformer circuit in which the high tension line passes from one fixture to the next series, but at each fixture the lamp is supplied by a transformer which gives only the low tension current to the lamp. In this case the high tension line is continuous through the various transformers, and accordingly no film cut-outs or similar devices need be used. The failure of one lamp in the line will not seriously affect the operation of the other lamps in the line. In this type of circuit also, incandescent lamps and metal vapor lamps can be used indiscriminately, either alone or in combination.

This type of circuit, furthermore, is especially adapted for the satisfactory operation of my lamp because an open secondary circuit produces a very high peak voltage across the open terminals which is very advantageous in restarting the lamps. Thus I have found that lamps which, due to the increased voltage when they are heated from operation, would not ordinarily restart for twenty minutes on an ordinary constant voltage supply can be started as quickly as two minutes with an isolation transformer circuit.

I have illustrated such a circuit in Fig. 29 in which the primary is supplied with high tension current through the lead 130 and 131. At each lamp fixture is a transformer the secondary of which is connected to the lamp 100. If the primary is fed from a constant current source a 1 to 1 current ratio step down transformer is suitable for the transformer 132. This being common practice in street lighting circuits.

In order to intensify the starting voltage available, as already described, from the transformer, I may include a condenser 106a in the circuit across the electrodes of the lamp in parallel to the discharge. This I have shown for example in Fig. 30 in which only the circuit at one fixture is shown, as a modification of the typical isolation transformer circuit shown in Fig. 29.

Another advantage of the series circuit including the isolation transformer circuit just described, is that it substantially reduces or eliminates the flicker in the discharge lamp when alternating current is used. This is due to the fact that with the high tension alternating current the rate of change of the voltage as it approaches zero on each alternation is much steeper so that the period during which the lamp is out and before the voltage has increased sufficiently to restart it on the following cycle is considerably reduced from that which occurs on an ordinary alternating current line when connected directly, e. g., as shown in Fig. 23.

In designing lamps for series operation, there are special considerations and problems which should be kept in mind. In the first place it should be remembered that the lamps are or may be subjected to very much higher voltages than in the case of lamps connected directly to a low voltage line. For this reason it is important that the connections within the lamp should not be too close together, in order to avoid arcing between these connections. For the same reason it is preferable not to evacuate the space within the outer jacket, but to leave it filled with atmospheric air. If the lamps are to be used outdoors they are preferably sealed from the atmosphere after the bases are cemented onto the lamp in order that they may be entirely waterproof. Of if for any reason it is preferred to use a sealed envelope as the jacket I prefer to fill the envelope with air or a gas of approximately one atmosphere before it is sealed.

In the second place, due to this same fact, of the higher voltage to which the lamp may be subjected it is particularly important to provide sufficient insulation between the starting strip 57, if used, and the wall of the envelope so that upon restarting when the envelope is hot and therefore to some slight degree at least, conductive, it will be protected against serious electrolysis or even puncturing of the glass due to the high tension applied. I have found that the use of mica insulation under the strip 57 and between the strip 57 and any additional capacity on the surface of the glass, as for example, the annular wire 53, will serve this purpose very well.

In designing lamps to provide a definite light output or wattage input the usual procedure must be reversed. In the ordinary case of lamps in multiple circuits, they are required to operate from a constant potential source and the wattage is controlled by regulating the current input. With a series circuit, however, the current input is constant and the only means of controlling the light output or wattage input without using special transformers is to vary the voltage across the electrodes of the lamp. This I may readily do in making the lamp, e. g., by specifically limiting the amount of metal provided in the vaporizable filling, e. g., as described above, so that when all the filling is vaporized during operation a definite voltage drop will exist between the electrodes. Or, preferably, with the pressure of the vaporizable filling chosen on grounds of efficiency of operation, the voltage will be controlled by placing the electrodes closer together or farther apart, as more fully described above under the general discussion of dimensions and design of the lamp.

I have found that a fair average power factor for lamps constructed according to my invention is about .875 within the voltage range and wattage range commonly used in series lighting. Thus if a series circuit having a constant current of 6.6 amperes is to be provided with a 300 watt lamp, the voltage required would be 300 6.6×.875 or 52 volts. Similarly a 200 watt lamp would have about 34.6 volts a 400 watt lamp about 69.2 volts and a 500 watt lamp about 86.6 volts between electrodes. These values are of course only approximations, since the power factor has been assumed as .875 whereas the actual power factor depending upon the design and the voltage of the lamp may vary over approximately the range between .80 and .95. In general the lower the voltage across the electrodes the lower will be the power factor of the lamp alone.

I have mentioned above the problem of flickering. Ordinarily on commercial frequencies this problem is not a serious one, but if for any reason the flicker which is encountered with a given current is objectionable it may readily be controlled by using a multi-phase current or by providing lamps radiating to the same areas from different circuits which are out of phase, so that either one or the other of the lamps will be illuminating the given area at all times.

In the accompanying drawings and in the above description and specification I have set forth in some detail the preferred forms of my invention as applicable to various conditions and uses and have suggested various modifications thereof. In doing this however, I have not exhaustively covered all modifications and methods of practicing my invention. On the contrary, I have chosen those best calculated to explain my invention and the principles thereof to assist those skilled in the art to apply my invention to various conditions and requirements which may be met in actual practice. It is intended that those skilled in the art should depart from the exact form shown and described and such departures are of course included within the scope of this application.

I claim:

1. An electrical discharge device which comprises an envelope, a filling within said envelope of a material adapted to provide a gaseous medium for the discharge, electrodes spaced therein, lead-in connections, a jacket enclosing and spaced from the envelope, a filling in said jacket of a material adapted to provide a gaseous medium for a discharge and electrodes in said jacket external to said envelope forming a discharge path in series with that between the electrodes in the envelope.

2. The combination of a plurality of electrical discharge lamps in parallel with each other and in series with a common current limiting device, one of said lamps having when cold an appreciable lower starting voltage adapted to assure its starting first and said lamp including a vaporizable material which is vaporized during operation of the lamp in amount sufficient to raise the re-starting potential of the lamp above the available voltage.

3. The combination as defined in claim 2 which further includes a light controlling fixture adapted to condition light distribution from the lamp, the first-starting lamp is related thereto to give the desired distribution and a lamp which starts at higher voltage is placed so as to give with said fixture a different distribution whereby the substitution of the latter may be readily apparent.

4. A lamp for horizontal burning comprising an elongated tube, electrodes near opposite ends of the tube, a filling in the tube of a material which under operating conditions gives the arc discharge between the electrodes the form of a constricted luminous cord characteristic of a high pressure arc, a jacket over said tube for restricting heat dissipation therefrom, and means for supplying current to the electrodes sufficient to soften the wall of the tube if the discharge should occur at said wall, said jacket and tube being in most efficient heat-exchange relation near the part of the tube where the arc would otherwise tend to rise to the greatest altitude, whereby the arc is depressed by the strong cooling of the filling material near that part of the tube wall.

5. In an electric lamp of the character described, the combination of an enclosing envelope, a pair of electrodes within said envelope, a gaseous filling within said envelope for maintaining an arc-like discharge between said electrodes, an auxiliary starting electrode on the exterior of said envelope, and an electrolytic shield in the form of a strip of mica interposed between said starting electrode and said envelope.

6. In an electric lamp of the character described, the combination of an enclosing envelope, a pair of electrodes within said envelope, a filling of metal vapor within said envelope, another envelope enclosing the first envelope, metallic means supporting the first envelope within the second envelope and electrically connected to one of said electrodes, and insulator means interposed between said metallic means and the first envelope to prevent electrolytic blackening thereof which, on account of the proximity of parts, would occur in the absence of said insulator means.

7. An electric lamp according to claim 6 in which the insulating means is in the form of a layer of mica interposed between the frame member and the wall of the envelope.

HANS J. SPANNER.